United States Patent
Royak et al.

(10) Patent No.: US 9,985,565 B2
(45) Date of Patent: May 29, 2018

(54) SENSORLESS MOTOR DRIVE VECTOR CONTROL WITH FEEDBACK COMPENSATION FOR FILTER CAPACITOR CURRENT

(71) Applicant: Rockwell Automation Technologies, Inc., Mayfield Heights, OH (US)

(72) Inventors: Semyon Royak, Orange Village, OH (US); Jingya Dai, Brunaby (CA); Jingbo Liu, Grafton, WI (US); Thomas A. Nondahl, Greenfield, WI (US); Ehsan Al-Nabi, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days. days.

(21) Appl. No.: 15/131,160

(22) Filed: Apr. 18, 2016

(65) Prior Publication Data

US 2017/0302209 A1   Oct. 19, 2017

(51) Int. Cl.
*H02P 9/48* (2006.01)
*H02P 21/13* (2006.01)
*H02P 23/14* (2006.01)
*H02P 25/02* (2016.01)
*H02P 6/18* (2016.01)

(52) U.S. Cl.
CPC ............ *H02P 23/14* (2013.01); *H02P 6/18* (2013.01); *H02P 25/02* (2013.01)

(58) Field of Classification Search
CPC .................................. H02M 3/158; H02M 5/12
See application file for complete search history.

(56) References Cited

U.S. PATENT DOCUMENTS

| | | | |
|---|---|---|---|
| 3,723,840 A | 3/1973 | Opal et al. | |
| 4,823,251 A | 4/1989 | Kawabata et al. | |
| 5,032,771 A | 7/1991 | Kerkman | |
| 5,526,252 A * | 6/1996 | Erdman | H02J 3/06 323/207 |
| 5,703,449 A | 12/1997 | Nagate | |
| 5,717,305 A | 2/1998 | Seibel | |
| 5,744,921 A | 4/1998 | Makaran | |
| 5,909,098 A | 6/1999 | Konecny et al. | |
| 5,959,431 A | 9/1999 | Xiang | |
| 5,990,654 A | 11/1999 | Skibinski et al. | |
| 5,994,869 A | 11/1999 | Becerra | |

(Continued)

FOREIGN PATENT DOCUMENTS

| | | |
|---|---|---|
| CN | 2513286 Y | 9/2002 |
| CN | 101383585 A | 3/2009 |

(Continued)

OTHER PUBLICATIONS

"Guidelines for the Use of 400-600 Volt AC Drives in Medium Voltage Applications," Yaskawa Application Note, Jun. 7, 2005.

(Continued)

*Primary Examiner* — Eduardo Colon Santana
*Assistant Examiner* — Charles S Laughlin
(74) *Attorney, Agent, or Firm* — Fay Sharpe LLP

(57) ABSTRACT

Disclosed examples include motor drive power conversion systems with an inverter, as well as a controller methods to drive a motor in which output filter capacitor currents are computed and used to compensate the motor control in consideration of damping resistance values of an output filter.

20 Claims, 12 Drawing Sheets

(56) References Cited

U.S. PATENT DOCUMENTS

| | | | |
|---|---|---|---|
| 6,121,736 A | 9/2000 | Narazaki et al. | |
| 6,124,697 A | 9/2000 | Wilkerson | |
| 6,208,537 B1 | 3/2001 | Skibinski et al. | |
| 6,222,335 B1 | 4/2001 | Hiti et al. | |
| 6,329,781 B1 | 12/2001 | Matsui et al. | |
| 6,600,980 B1 | 7/2003 | Kraska et al. | |
| 6,940,249 B2 | 9/2005 | Toyoda | |
| 6,965,212 B1 | 11/2005 | Wang et al. | |
| 7,045,988 B2 | 5/2006 | Ha et al. | |
| 7,049,778 B2 | 5/2006 | Katanaya | |
| 7,084,604 B2 | 8/2006 | Salomaki | |
| 7,102,323 B2 | 9/2006 | Zhou et al. | |
| 7,468,595 B2 | 12/2008 | Lee | |
| 7,679,308 B2 | 3/2010 | Tomigashi | |
| 7,683,568 B2 | 3/2010 | Pande et al. | |
| 7,724,549 B2 | 5/2010 | Skibinski et al. | |
| 7,729,146 B2 | 6/2010 | Hayami et al. | |
| 7,920,393 B2 | 4/2011 | Bendre et al. | |
| 7,932,693 B2 | 4/2011 | Lee | |
| 7,979,223 B2 | 7/2011 | Monti et al. | |
| 7,990,097 B2 * | 8/2011 | Cheng | H02M 5/4585 318/800 |
| 8,009,450 B2 | 8/2011 | Royak et al. | |
| 8,143,838 B2 | 3/2012 | Akiyama | |
| 8,217,602 B2 | 7/2012 | Ikei | |
| 8,232,760 B2 | 7/2012 | Lu et al. | |
| 8,288,886 B2 | 10/2012 | Anwar et al. | |
| 8,299,646 B2 | 10/2012 | Rockenfeller et al. | |
| 8,350,507 B2 | 1/2013 | Ito | |
| 8,541,971 B2 | 9/2013 | Sakai | |
| 8,736,220 B2 | 5/2014 | Ogawa et al. | |
| 8,890,450 B2 | 11/2014 | Maekawa | |
| 8,970,154 B2 | 3/2015 | Ishikawa et al. | |
| 8,981,702 B2 | 3/2015 | Katariya et al. | |
| 2004/0052097 A1 | 3/2004 | Morimoto | |
| 2005/0012339 A1 | 1/2005 | Mikhail et al. | |
| 2006/0113952 A1 | 6/2006 | Zhou | |
| 2007/0001635 A1 | 1/2007 | Ho | |
| 2007/0007929 A1 | 1/2007 | Lee et al. | |
| 2008/0001571 A1 | 1/2008 | Tomigashi | |
| 2008/0074074 A1 | 3/2008 | Skibinski et al. | |
| 2008/0300820 A1 | 12/2008 | Hu | |
| 2008/0312855 A1 | 12/2008 | Monti et al. | |
| 2009/0146592 A1 | 6/2009 | Tobari et al. | |
| 2009/0153083 A1 | 6/2009 | Rozman | |
| 2009/0200980 A1 | 8/2009 | Ramu et al. | |
| 2011/0062908 A1 | 3/2011 | Kitanaka | |
| 2011/0084638 A1 | 4/2011 | Patel et al. | |
| 2011/0109155 A1 | 5/2011 | Anwar et al. | |
| 2011/0181232 A1 | 7/2011 | Krishnamoorthy et al. | |
| 2012/0038300 A1 | 2/2012 | Kato et al. | |
| 2012/0081061 A1 | 4/2012 | Zargari et al. | |
| 2012/0268056 A1 | 10/2012 | Liu | |
| 2013/0063059 A1 | 3/2013 | Chi et al. | |
| 2013/0153180 A1 | 6/2013 | Montocchio et al. | |
| 2013/0187579 A1 | 7/2013 | Rozman et al. | |
| 2014/0197774 A1 * | 7/2014 | Liu | H02M 1/126 318/721 |
| 2014/0228980 A1 | 8/2014 | Ohta et al. | |
| 2014/0312811 A1 | 10/2014 | Liu et al. | |
| 2015/0002059 A1 * | 1/2015 | Liu | H02P 6/08 318/400.04 |
| 2015/0002067 A1 | 1/2015 | Rowan et al. | |
| 2015/0091484 A1 * | 4/2015 | Royak | H02M 5/4585 318/400.26 |
| 2015/0123579 A1 | 5/2015 | Liu et al. | |

FOREIGN PATENT DOCUMENTS

| | | | |
|---|---|---|---|
| CN | 201504207 U | 6/2010 | |
| CN | 101950983 A | 1/2011 | |
| CN | 102045021 A | 5/2011 | |
| CN | 102349230 A | 2/2012 | |
| CN | 202872721 U | 4/2013 | |
| CN | 103190068 A | 7/2013 | |
| EP | 1635448 A1 | 3/2006 | |
| EP | 1868288 A1 | 12/2007 | |
| GB | 2390766 A * | 1/2004 | H02P 21/06 |
| JP | 2001-025282 | 1/2001 | |
| JP | 2002034289 A | 1/2002 | |
| WO | WO2009093214 A2 | 7/2009 | |

OTHER PUBLICATIONS

Agarlita, Sorin-Cristian et al., "I-f Starting and Active Flux Based Sensorless Vector Control of Reluctance Synchronous Motors, with Experiments", $12^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE $13^{th}$ Int'l Conf. on Optimization of Electrical and Electronic Equipment (OPTIM), May, 2012, pp. 432-438.

Batzel, Todd D. et al., "*Electric Propulsion With Sensorless Permanent Magnet Synchronous Motor: Implementation and Performance*", IEEE Transactions on Energy Conversion, vol. 20, No. 3, pp. 575-583, Sep. 2005.

Carpaneto, et al., "A New Sensorless Permanent Magnet Synchronous Motor Algorithm Based on Algebraic Method"; $13^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Fatu et al., I-F Starting Method With Smooth Transition to EMF Based Motion-Sensorless Vector Control of PM Synchronous Motor/Generator, 2008, IEEE, pp. 1481-1487.

Halkassari, Optimal U/F-Control of High Speed Permanent Magnet Motors, 2006, IEEE, pp. 2302-2308.

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

J. Liu et al., "Rotor Position Estimation for Synchronous Machines Based on Equivalent EMF", IEEE Transactions on Industry Applications, vol. 47, pp. 1310-1318, May-Jun. 2011.

Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.

Kim et al., "PWM Switching Frequency Signal Injection Sensorless Methods in IPMSM", IEEE, 2011, pp. 3021-3028.

Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Kobayashi et al., "Investigation of IPMSM's Position Estimation in Low Speed Region with DC Link Current Detection", IEEE Jan. 2007, pp. 1411-1416.

Kojima, Mari et al., "*Novel Vector Control System Using Deadbeat-Controlled PWM Inverter With Output LC Filter*", IEEE Transactions on Industry Applications, vol. 40, No. 1, pp. 162-169, Jan./Feb. 2004.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

Kukrer, "Deadbeat Control of a Three-Phase Inverter with an Output LC Filter", IEEE Transactions on Power Electronics, vol. 11, No. 1, Jan. 1996, 8 pgs.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

(56) References Cited

OTHER PUBLICATIONS

Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Miranda et al., "Parameter and Speed Estimation for Implementing Low Speed Sensorless PMSM Drive System Based on an Algebraic Method"; Applied Power Electronics Conf.; APEC 2007, $22^{nd}$ Annual IEEE; Feb. 1, 2007,;pp. 1406-1410.

Miranda et al., "Sensorless Control of a PMSM Synchronous Motor at Low Speed"; IEEE Industrial Electronics; IECON 2006; $32^{nd}$ Annual Conf., IEEE; Piscataway, NJ; Nov. 1, 2006; pp. 5069-5074.

Moldovan et al., "Active-Flux Based, V/f-With-Stabilizing-Loops Versus Sensorless Vector Control of IPMSM Drives"; Industrial Electronics (ISIE); 2011 IEEE Int'l Symposium; Jun. 27, 2011; pp. 514-519.

Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.

Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.

Park et al., "Design and Control of High-Speed Solid-Rotor Synchronous Reluctance Drive With Three-Phase LC Filter", Conference Record of the 2005 IEEE Industry Applications Conf. $40^{th}$ IAS Annual Meeting, vol. 1, Oct. 2, 2005, pp. 715-722.

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

Ryvkin, S. et al., "Sensorless Oil Drowned Pump Drive", IEEE ISIE 2005, Jun. 20-23, 2005, Dubrovnik, Croatia, pp. 963-968.

Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2006.

Salomäki, J. et al., "*Sensorless Vector Control of PMSM Drives Equipped With Inverter Output Filter*", in Proceedings of the $32^{nd}$ Annual Conference of the IEEE Industrial Electronics Society (IECON 2006), Paris, France, pp. 1059-1064.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

Stirban et al., "Motion-Sensorless Control of BLDC-PM Motor With Offline FEM—Information-Assisted Position and Speed Observer"; IEEE Transactions on Industry Applications; IEEE Service Center, Piscataway, NJ; vol. 48, No. 6; Nov. 1, 2012; pp. 1950-1958.

Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet Nov. 26, 2014, 1 pg.

Yim et al., "A Predictive Current Control Associated to EKF for High Performance IPMSM Drives"; Applied Power Electronics Conf. and Exposition (APEC), 2011; $26^{th}$ Annual IEEE, Mar. 6, 2011; pp. 1010-1016.

Stirban et al., "Motion-Sensorless Control of BLDC-PM Motor With Offline FEM Information Assisted State Observer"; Optimization of Electrical and Electronic Equipment (OPTIM), 2010 $12^{th}$ International Conference, Ma 22, 2010, pp. 321-328.

\* cited by examiner

SENSORLESS MOTOR DRIVE VECTOR CONTROL WITH FEEDBACK COMPENSATION FOR FILTER CAPACITOR CURRENT

INCORPORATION BY REFERENCE

The following U.S. patents, patent applications and published patent applications are hereby incorporated by reference in their entireties: U.S. Pat. No. 9,124,209 issued Sep. 1, 2015 to Liu et al., entitled METHOD AND APPARATUS FOR CONTROLLING POWER CONVERTER WITH INVERTER OUTPUT FILTER; U.S. Patent Application Publication No. 2015/0123579 A1 to Liu et al., entitled METHOD AND APPARATUS FOR CONTROLLING POWER CONVERTER WITH INVERTER OUTPUT FILTER, and filed as U.S. patent application Ser. No. 14/555,769 on Nov. 28, 2014; U.S. Pat. No. 9,054,621 issued Jun. 9, 2015 to Liu et al., entitled POSITION SENSORLESS OPEN LOOP CONTROL FOR MOTOR DRIVES WITH OUTPUT FILTER AND TRANSFORMER; U.S. Patent Application Publication No. 2015/0194901 A1 to Liu et al., entitled POSITION SENSORLESS OPEN LOOP CONTROL FOR MOTOR DRIVES WITH OUTPUT FILTER AND TRANSFORMER, and filed as U.S. patent application Ser. No. 14/666,894 on Mar. 24, 2015; U.S. Pat. No. 9,054,611 issued Jun. 9, 2015 to Liu et al., entitled METHOD AND APPARATUS FOR STABILITY CONTROL OF OPEN LOOP MOTOR DRIVE OPERATION; U.S. Patent Application Publication No. 2015/0002067 A1 to Nondahl et al., entitled METHOD AND APPARATUS FOR STABILITY CONTROL OF OPEN LOOP MOTOR DRIVE OPERATION, and filed as U.S. patent application Ser. No. 14/193,329 on Feb. 28, 2014; U.S. patent application Ser. No. 14/565,781 filed Dec. 10, 2014 to Nondahl et al., entitled TRANSITION SCHEME FOR POSITION SENSORLESS CONTROL OF AC MOTOR DRIVES; U.S. patent application Ser. No. 15/014,360 filed Feb. 3, 2015 to Royak et al., entitled CONTROL OF MOTOR DRIVES WITH OUTPUT SINEWAVE FILTER CAPACITOR CURRENT COMPENSATION USING SINEWAVE FILTER TRANSFER FUNCTION; U.S. patent application Ser. No. 15/053,135 filed Feb. 25, 2016 to Nondahl et al., entitled SENSORLESS MOTOR DRIVE VECTOR CONTROL WITH FEEDBACK COMPENSATION FOR FILTER CAPACITOR CURRENT; and U.S. patent application Ser. No. 15/053,273 filed Feb. 25, 2016 to Nondahl et al., entitled SENSORLESS MOTOR DRIVE VECTOR CONTROL.

BACKGROUND INFORMATION

The subject matter disclosed herein relates to power conversion, and more specifically to motor drive control with feedback compensation for filter capacitor currents.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems with an inverter, as well as a controller, and control methods to drive a motor in which output filter capacitor currents are computed and used to compensate the motor control in consideration of damping resistance values of the output filter.

DETAILED DESCRIPTION

Figure 1:
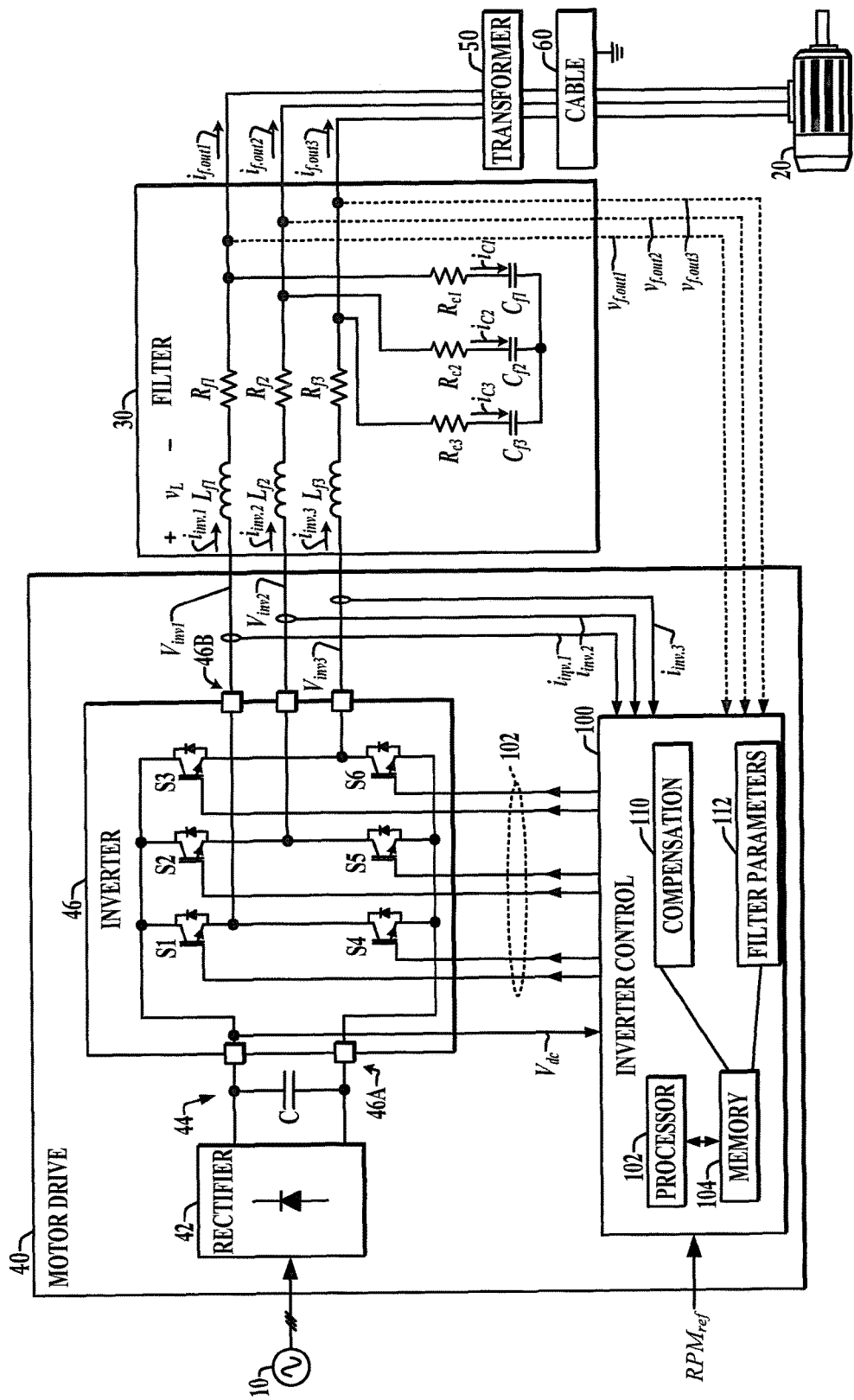
FIG. 1 is a schematic diagram.

Referring now to the figures, several embodiments or implementations are hereinafter described in conjunction with the drawings, wherein like reference numerals are used to refer to like elements throughout. FIGS. 1 and 2 show a motor drive power conversion system 40, including an inverter 46 to drive an output load, such as a motor 20 through an intervening filter 30, referred to herein as an output filter or a sine wave filter, and a motor cable 60. In certain implementations, as shown in FIG. 1, a transformer 50 can be connected between the output filter 30 and the driven motor load 20. Power conversion systems typically include an inverter stage to generate and provide AC output power to a load, such as a single or multi-phase AC motor. Pulse width modulated (PWM) output inverters provide output currents and voltages that include a number of pulses. Accordingly, output filters, such as sine wave filters are sometimes employed between the inverter output and the driven load to reduce the high frequency content caused by pulse width modulation of the inverter switches.

Disclosed examples include methods, computer readable mediums 104 and motor drives power conversion systems 40 for control of a motor 20 driven by an inverter 46 through the intervening filter 30. The drive 40 includes an inverter controller 100 with a processor 102 and a memory 104 which operate the switches S1-S6 of an inverter 46 to control the motor. The presence of the output filter 30 between the power conversion system 40 and the load 20 makes accurate control of the motor voltages and currents difficult, as the power delivered to the load 20 is different from that delivered to the input of the filter 30. The output inverter stage 46 may be controlled according to feedback signals measured at the inverter output terminals, but these feedback values generally do not represent the currents or voltages ultimately provided to the load 20. Feedback sensors can be provided at the load itself for direct measurement of the load parameters, but this increases system cost, and may not be possible in all applications. The controller 100 in certain examples compensates for filter capacitor current in consideration of damping resistance of the filter and adjusts the feedback current for current control.

The system 40 can be used in a variety of applications, particularly where providing position and/or speed sensors directly at a motor load 20 is difficult or impractical. In certain applications, a step-up transformer 50 is used to boost the motor drive output voltage, allowing use of a low-voltage drive to power a medium voltage induction motor 20, and/or to reduce I²R losses and facilitate use of a smaller diameter cable wire 60 for long cable runs between the motor drive 40 and the driven motor 20. Certain applications also employ output filters 30 between the motor drive inverter output and the transformer primary in order to suppress reflected wave voltage spikes associated with pulse width modulated (PWM) operation of variable frequency drives 40. Use of sensorless voltage-frequency control techniques, however, has previously been problematic, particularly where a transformer 50 and/or sine wave filter 30 is connected between the motor drive 40 and the motor load 20. Sensorless field-oriented-control (FOC) or other open loop speed control techniques have thus been found generally unsuitable for low-speed motor drive operation where output filters 30 and transformers 50 are used, such as in electric submersible pumps (ESPs), and these difficulties are particularly problematic in driving permanent magnet synchronous motors (PMSMs). Moreover, motors in sensorless speed control applications also suffer from oscillation in rotor velocity about the setpoint speed following load transitions or speed setpoint adjustments, particularly at low speeds. In certain situations, moreover, starting the driven motor from a stopped condition may be difficult due to unstable motor speed oscillations.

Presently disclosed embodiments provide power conversion systems 40 and inverter control methods and apparatus 100 to drive a motor load 20 through an intervening filter 30, which can also be used in combination with a transformer 50 and a potentially lengthy cables 60 coupled between the filter output and the driven motor load 20. FIG. 1 shows a motor drive power conversion system 40 with an inverter 46 and an inverter controller 100 configured to control current of a driven motor load 20 based on sensed or computed inverter output current signals or values $i_{inv.1}$, $i_{inv.2}$ and $i_{inv.3}$ representing output currents flowing at an AC output 46B of the inverter 46. The motor drive 40 receives single or multiphase AC input power from a power source 10 and converts this to a DC bus voltage using a rectifier 42 which provides a DC output voltage to a DC link circuit 44 having a capacitor C. The rectifier 42 can be a passive rectifier including one or more diode rectifier components, or may be an active front end (AFE) system with one or more rectifier switching devices (e.g., IGBTs, SiC transistors, IGCTs, etc.) and an associated rectifier controller (not shown) for converting input AC electrical power to provide the DC bus voltage in the link circuit 44. Other configurations are possible in which the drive 40 receives input DC power from an external source (not shown) to provide an input to the inverter 46, in which case the rectifier 42 may be omitted.

The DC link circuit 44 may include a single capacitor C or multiple capacitors connected in any suitable series, parallel and/or series/parallel configuration to provide a DC link capacitance across inverter input terminals 46A. In addition, while the illustrated motor drive 40 is a voltage source converter configuration including one or more capacitive storage elements in the DC link circuit 44, the various concepts of the present disclosure may be implemented in association with current source converter architectures in which a DC link circuit 44 includes one or more inductive storage elements, such as one or more series-connected inductors situated between the source of DC power (e.g., rectifier 42 or external DC source) and the input 46A of the inverter 46. In other possible implementations, the motor drive 40 includes a direct DC input to receive input power from an external source (not shown), and in certain embodiments the rectifier 42 and DC link circuit 44 may both be omitted.

The DC input 46A of the inverter 46 includes first and second (e.g., plus and minus) terminals connected to the DC link circuit 44, as well as a plurality of switching devices S1-S6 coupled between the DC input 46A and the motor drive AC output 46B. In operation, the inverter switching devices S1-S6 are actuated by inverter switching control signals 102 provided by the controller 100 to convert DC electrical power received at the DC input 46A to provide AC electrical output power as inverter output voltages $V_{inv1}$, $V_{inv2}$ and $V_{inv3}$ and inverter output currents $i_{inv.1}$, $i_{inv.2}$ and $i_{inv.3}$ at the AC output 46B. The filter circuit 30 receives the AC output from the inverter 46 of the motor drive 40. The motor drive 40 can be employed in connection with permanent magnet synchronous motors 20, or other types of AC motor loads 20 such as medium voltage induction motors 20, for example.

One or more feedback signals or values may be provided from the motor 20 itself, including a motor (e.g., rotor) position or angle signal Theta and a motor speed or velocity signal $RPM_{fbk}$, although not a strict requirement of all embodiments of the present disclosure. Moreover, the concepts of the present disclosure advantageously facilitate sensorless speed estimation and vector control-based speed regulation by the inverter controller 100, and thus direct feedback from the driven motor load 20 is not required in all implementations. The motor drive 40 in certain embodiments implements a motor speed and/or position and/or torque control scheme in which the inverter controller 100 selectively provides the switching control signals 102 in a closed and/or open-loop fashion according to one or more setpoint values such as a motor speed setpoint $RPM_{ref}$, which can be a signal or value generated by the controller 100, or a fixed setpoint value, or such setpoint value can be received from an external system (not shown). In practice, the motor drive 40 may also receive a torque setpoint and/or a position (e.g., angle) setpoint, and such desired signals or values (setpoint(s)) may be received from a user interface and/or from an external device such as a distributed control system, etc. (not shown). As used herein, a signal can be an analog signal, such as a current or a voltage signal, or a signal can include digital values generated or consumed by the processor 102.

In the example of FIG. 1, the inverter 46 is connected to the load 20 through the intervening filter circuit 30. The filter 30 in FIG. 1 is an "L-C" configuration in which each of the power converter output lines is connected to the motor through a series-connected filter inductor $L_{f1}$, $L_{f2}$ or $L_{f1}$ with a corresponding filter capacitor $C_{f1}$, $C_{f2}$ or $C_{f3}$ connected between the corresponding motor line and a common connection point (a neutral of a Y-connected set of filter capacitors $C_{f1}$, $C_{f2}$ and $C_{f3}$ in FIG. 1). The filter 30 also includes resistances $R_{f1}$, $R_{f2}$ and $R_{f3}$ individually connected in series with the corresponding filter inductors $L_{f1}$, $L_{f2}$ and $L_{f1}$. The filter 30 in FIG. 1 further includes damping resistors $R_{c1}$, $R_{c2}$ and $R_{c3}$ individually connected in series with the corresponding filter capacitors $C_{f1}$, $C_{f2}$ and $C_{f3}$. The damping resistors can be omitted in certain embodiments. Other implementations are possible in which the filter capacitors $C_f$ and the corresponding damping resistors $R_c$ are connected in a "Delta" configuration (not shown). In the illustrated (Y-connected) configuration, the filter circuit neutral point can be optionally connected to a circuit ground or other common connection point associated with the motor drive 40, although not a strict requirement of the present disclosure. The disclosed apparatus and techniques can be employed in connection with other forms and types of filter circuits 30, including without limitation L-C-L circuits, etc.

The output of the filter circuit 30 provides phase currents $i_{f.out1}$, $i_{f.out2}$, and $i_{f.out3}$ to control the motor load 20 (e.g., through the intervening transformer 50 and cable 60). However, filter capacitor currents $i_{c1}$, $i_{c2}$, and $i_{c3}$ flow in the filter capacitors $C_{f1}$, $C_{f2}$ and $C_{f3}$, respectively, and non-zero filter voltages $v_L$ may develop across one or more of the filter inductors $L_{f1}$, $L_{f2}$ and $L_{f1}$. Simple closed-loop control based on measured inverter output current signals or values $i_{inv.1}$, $i_{inv.2}$ and $i_{inv.3}$ may thus result in less than optimal operation of the driven load 20. Directly measuring the filter output currents $i_{f.out1}$, $i_{f.out2}$, and $i_{f.out3}$ and/or motor currents and/or motor voltages, however, would require additional hardware and cabling, and may not be economically feasible or technically possible in certain applications. Nevertheless, for those cases where motor and/or filter output currents and/or drive output voltages such as $V_{inv1}$, $V_{inv2}$ and $V_{inv3}$, and/or filter output voltages are measured, those signals can be used to enhance or replace the inverter current and/or voltage signals in the control operation of the drive 40.

The inverter controller 100 advantageously provides sensorless vector control using computer executable instructions stored in a computer-readable electronic memory 104, which are executed by a processor 102 to implement vector control to regulate the motor speed. In addition, the controller 100 computes filter capacitor current values $i_{cap.comp.d}$ and $i_{cap.comp.q}$ for steady state or instantaneous control compensation according to inverter output current values filter output voltage values $V_{f.out1}$, $V_{f.out2}$, and $V_{f.out3}$ representing output voltages of the filter 30, capacitance values representing capacitances of filter capacitors $C_{f1}$, $C_{f2}$ and $C_{f3}$ of the filter 30, resistance values representing resistances of filter resistors $R_{c1}$, $R_{c2}$ and $R_{c3}$ of the filter 30, and a speed feedback value $\omega_e$ representing the inverter electrical frequency of a previous control cycle. The controller 100 controls the inverter 46 to regulate the rotational speed of the motor 20 at least partially according to the compensated current values $i_{cap.comp.d}$ and $i_{cap.comp.q}$.

In various implementations, the controller 100 performs speed regulation and/or position/speed estimation functions according to one or more voltage and/or current values associated with the motor drive system 40, which can be measured values at the inverter output, at the output of the filter 30, at the output (e.g., secondary) of the transformer 50 or combinations thereof, in conjunction with observer system parameters that represent impedance parameters of the filter 30, the transformer 50, the motor cable 60 and the motor 20 to facilitate reliable, stable speed control of the driven motor 20. For example, as seen in FIG. 1, the illustrated drive 40 may include one or more current sensors configured to measure, sense, or otherwise detect at least one inverter output feedback signal or value (e.g., output currents $i_{inv.1}$, $i_{inv.2}$ and $i_{inv.3}$) which represent the output current at the AC output 46B of the inverter 46. The inverter controller 100 thus accommodates the presence of the filter circuit 30 (e.g., and any optionally included transformer 50 and potentially lengthy motor cable 60) between the motor drive output 46B and the driven motor load 20, without requiring addition of external sensors to sense the actual rotor speed and/or position conditions at the motor load 20.

In operation, the controller 100 provides inverter switching control signals 102 to operate the switches S1-S6 of the inverter 46 to regulate the rotational speed of the motor 20 at least partially according to the inverter speed feedback value $RPM_{fbk}$ using vector control. The controller 100 and the components thereof may be any suitable hardware, processor-executed software, processor-executed firmware, logic, or combinations thereof that are adapted, programmed, or otherwise configured to implement the functions illustrated and described herein. The controller 100 in certain embodiments may be implemented, in whole or in part, as software components executed using one or more processing elements, such as one or more processors 102, and may be implemented as a set of sub-components or objects including computer executable instructions stored in the non-transitory computer readable electronic memory 104 for operation using computer readable data executing on one or more hardware platforms such as one or more computers including one or more processors, data stores, memory, etc. The components of the controller 100 may be executed on the same computer processor or in distributed fashion in two or more processing components that are operatively coupled with one another to provide the functionality and operation described herein.

Figure 2A:
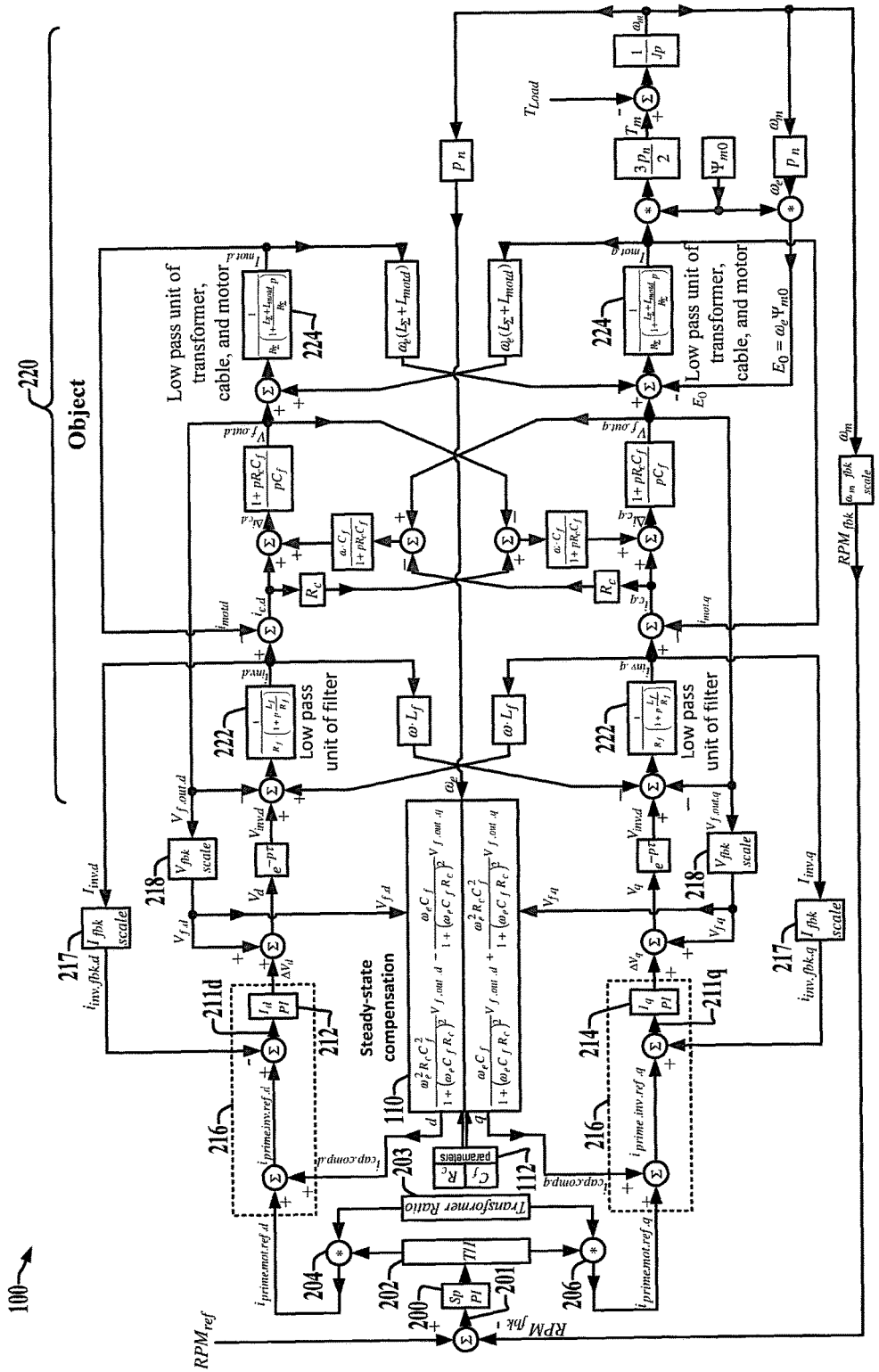
FIG. 2A is a schematic diagram.
Figure 2B:
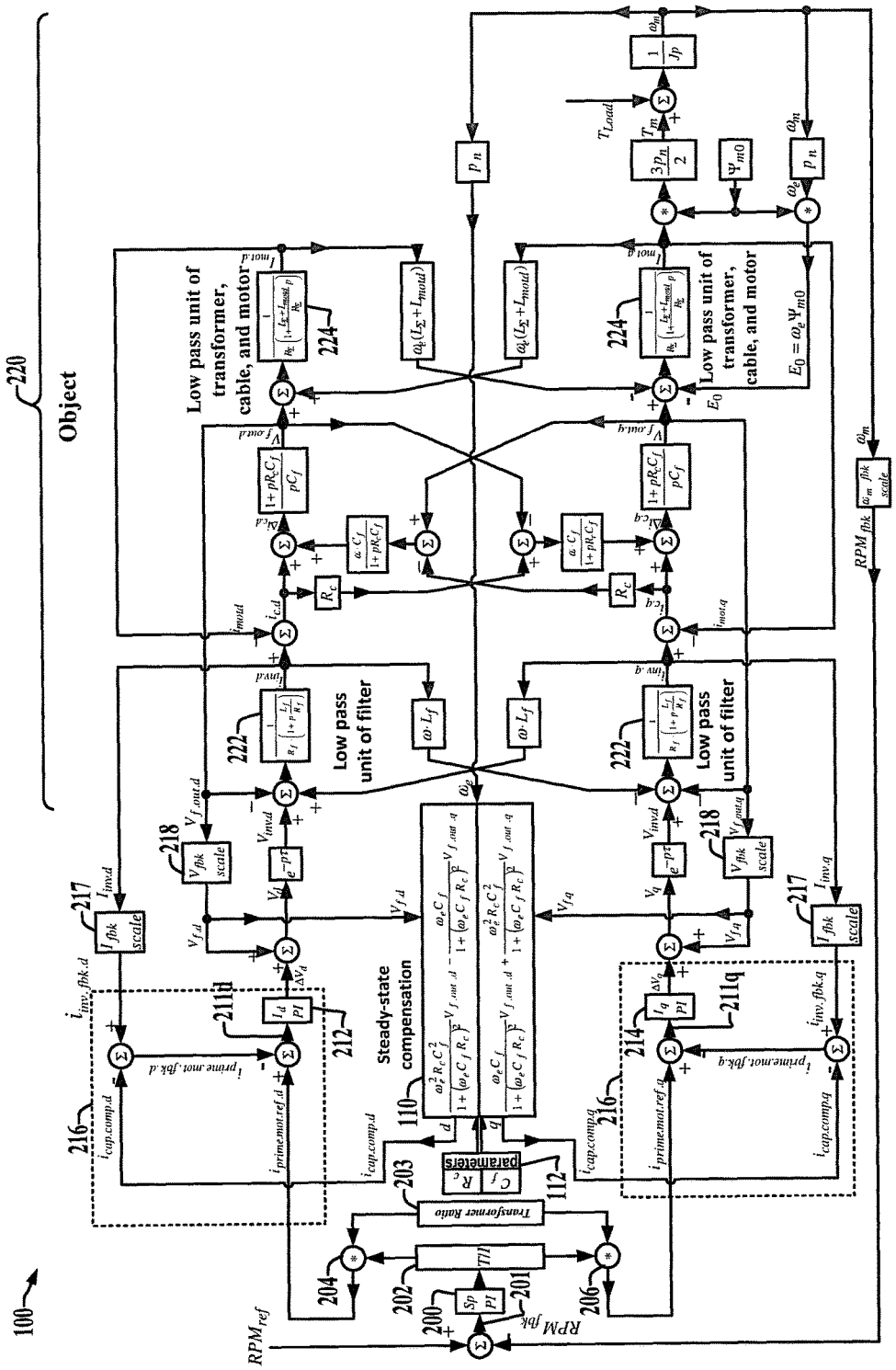
FIG. 2B is a schematic diagram.
Figure 10A:
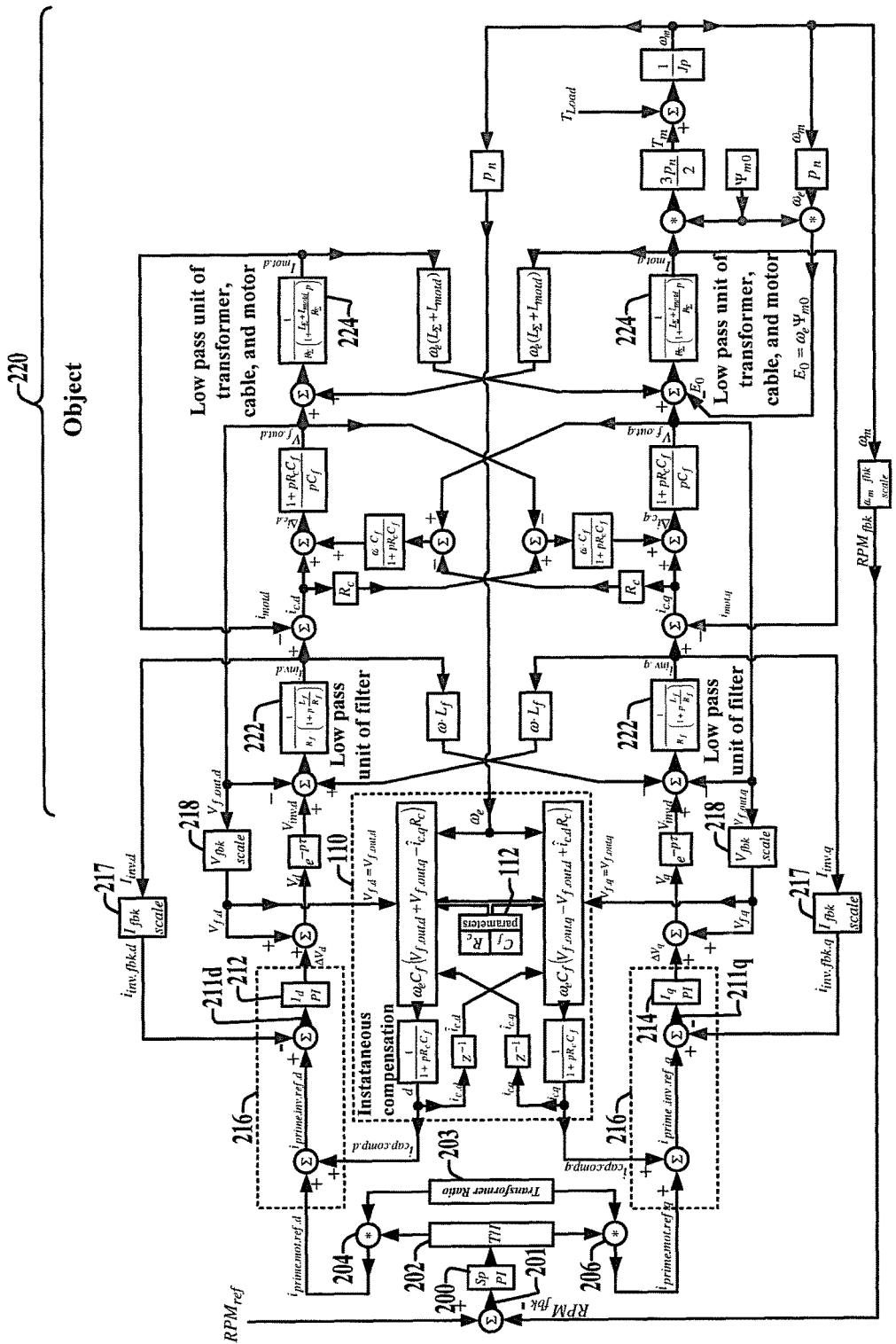
FIG. 10A is a schematic diagram.
Figure 10B:
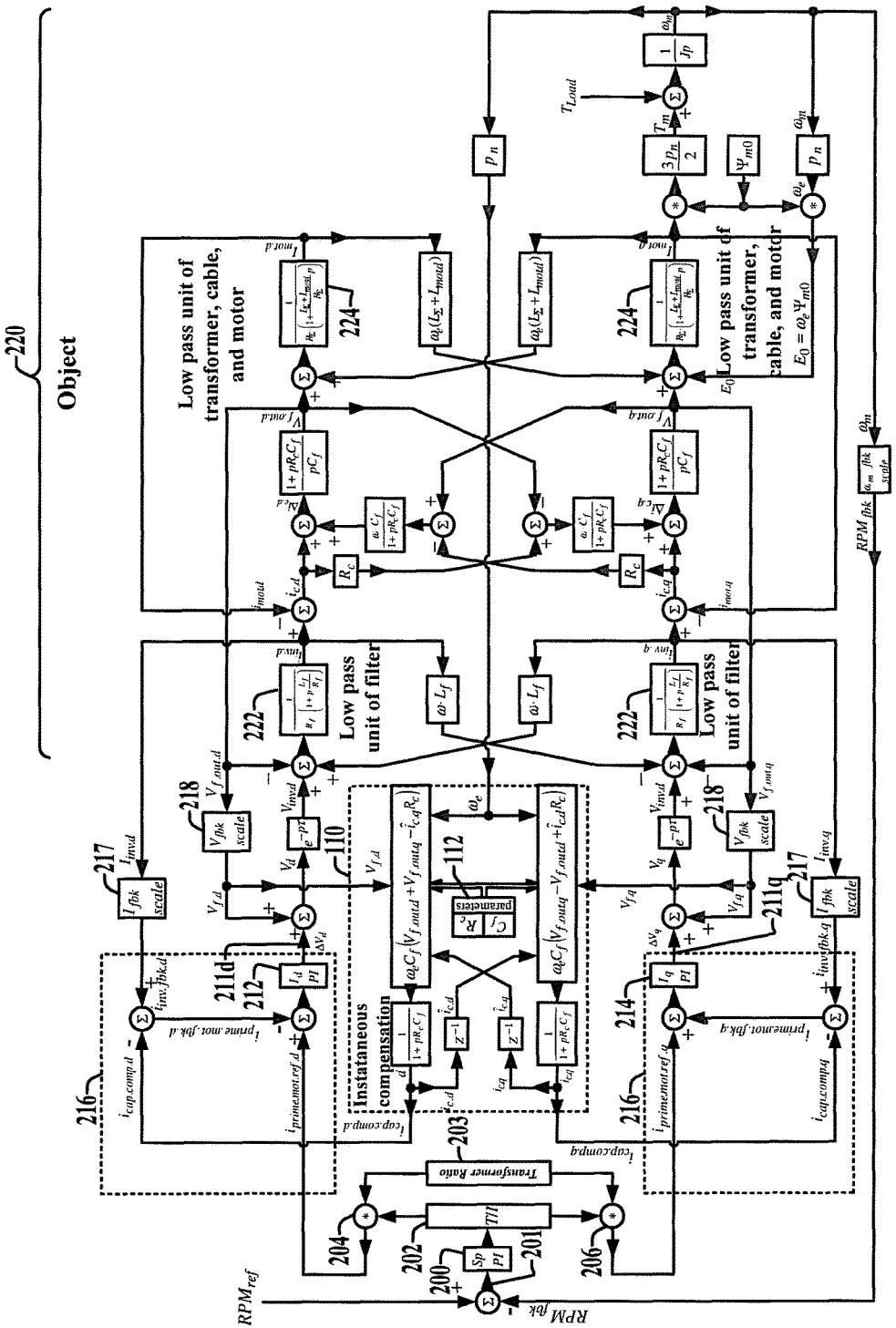
FIG. 10B is a schematic diagram.

The controller 100 operates in various examples to perform RPM or speed control of a motor load 20 providing the inverter switching control signals 102 in order to operate the inverter 46 to provide the drive current to the motor 20 including compensation of a motor current reference value or values according to the output filter capacitor currents in consideration of filter capacitors (e.g., $c_f$ in the filter 30 above) and filter resistors (e.g., $R_c$). FIGS. 2A and 2B illustrate non-limiting examples of steady state compensation. FIGS. 10A and 10B below illustrate further non-limiting examples in which the controller 100 implements instantaneous current compensation.

Figure 3:
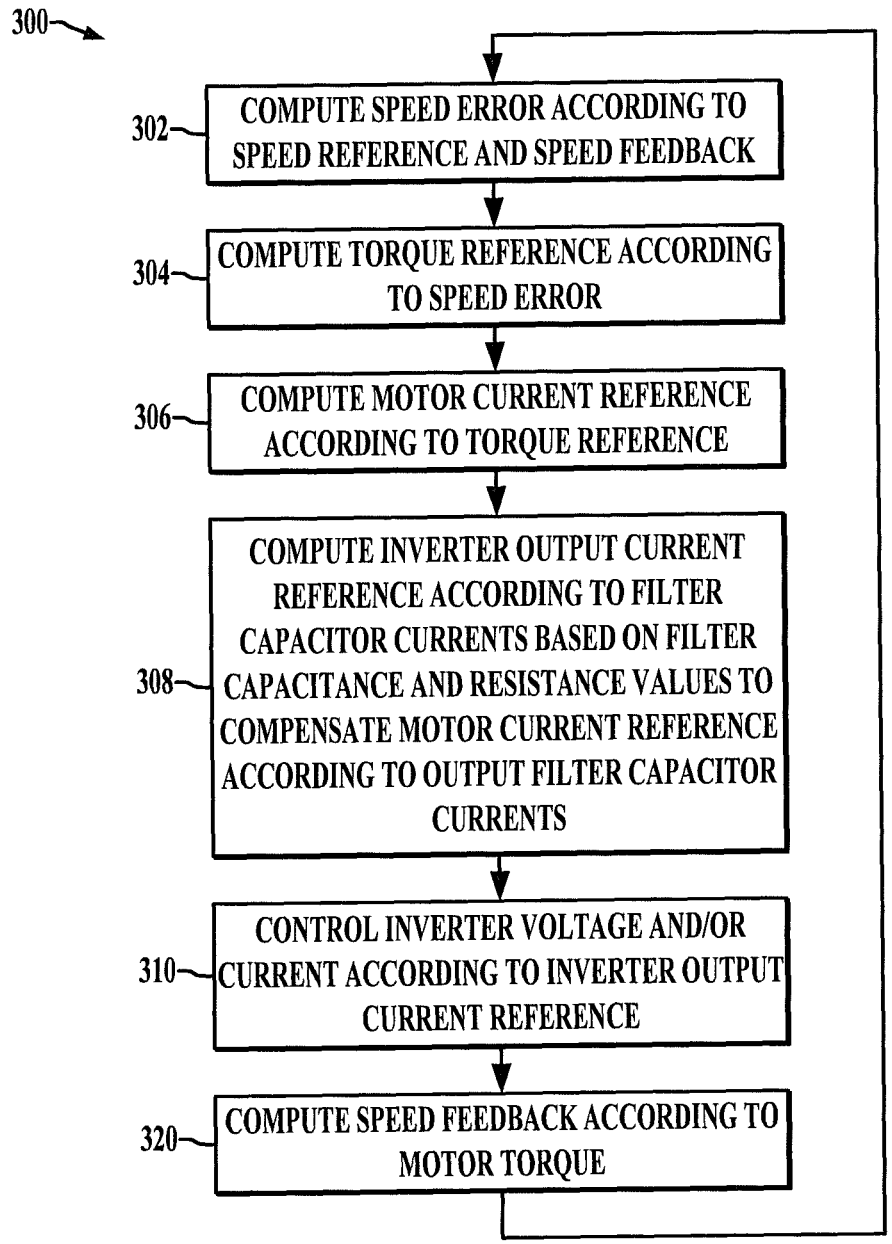
FIG. 3 is a flow diagram.

The controller 100 in certain embodiments is configured by execution in the processor 102 of instructions in the memory 104 to implement the control configurations illustrated in FIG. 2A or 2B for steady-state compensation or those in FIG. 9A or 9B below for instantaneous compensation for filter capacitor current flow, as described hereinafter in conjunction with the process 300 of FIG. 3. At 302 in FIG. 3, the controller 100 computes 302 a speed error value (201 in FIG. 2A) according to a speed reference value $RPM_{ref}$ and a speed feedback value $RPM_{fbk}$, for example, as the difference between the feedback value and the reference value. The feedback value $RPM_{fbk}$ can be obtained from any suitable source, including actual speed sensors (not shown) or from an emf-based speed observer or other observer (not shown). In the example of FIG. 2A, the feedback value $RPM_{fbk}$ is derived from an estimated motor speed value $\omega_m$ using a feedback scaling component $\omega_{m\,fbk\,scale}$ implemented by the processor 102. As seen in FIG. 2A, the controller 100 implements a speed proportional-integral (PI) control component 200 which receives the resulting speed error signal 201 and operates according to known proportional-integral control operation to compute a torque reference value according to the speed error value 201 at 304 in FIG. 3. At 306 in FIG. 3, the controller 100 uses one or more torque/current (T/I) lookup tables 202 or solves one or more parametric equations (not shown) to compute one or more motor current reference values based on the computed torque reference value. In the example of FIG. 2A, the controller 100 computes d and q axis motor current reference values at 306 according to the torque reference value, where this computation in certain examples includes indexing the lookup table 202. The controller 100 scales the d and q axis motor current reference values according to a turns ratio 203 of the output transformer 50 (FIG. 1) via multiplier components 204 and 206, respectively to compute d and q axis motor current reference values $I_{prime.mot.ref.d}$ and $I_{prime.mot.ref.q}$.

At 308, the controller 100 compensates motor current reference value or values $I_{prime.mot.ref.d}$ and $I_{prime.mot.ref.q}$ according to d and q axis capacitor currents $i_{cap.comp.d}$ and $i_{cap.comp.q}$ of the output filter 30. This is done in one example by the controller 100 computing one or more (e.g., d and q axis) inverter output current reference values 211d and 211q according to the motor current reference values $I_{prime.mot.ref.d}$ and $I_{prime.mot.ref.q}$, the inverter electrical operating frequency $\omega_e$, a capacitance value of filter capacitor components $c_f$ of the output filter 30, and a resistance value of filter resistor components $R_c$ of the output filter 30. In the steady state compensation example of FIG. 2A, the controller 100 includes a steady state compensation component 110 that receives scaled filter output voltage signals or values, for example, computed d and q axis values $V_{f.d}$ and $V_{f.q}$ from scaling components 218 which scale filter output voltage values $V_{f.out.d}$ and $V_{f.out.q}$ computed by an object or model 220 that represents the output filter 30, the transformer 50, the cable 60 and the motor 20 connected to the output of the inverter 46 in the system of FIG. 1. The steady state compensation component 110 also receives the inverter electrical operating frequency $\omega_e$, representing the operating frequency of the inverter 46 and a current or previous control cycle. In the example of FIG. 2A, the model or object 220 computes a motor frequency value $\omega_m$, representing the speed of the motor load 20, and a scaling component p, scales the motor frequency value $\omega_m$, according to the number of poles p, of the motor load 20 to provide the scaled inverter electrical operating frequency $\omega_e$ for use by the compensation component 110. The compensation component 110 also uses filter parameters 112 stored in the memory 104 of the controller 100, including the capacitance value or values of filter capacitor components (e.g., $c_f$), and one or more resistance values of filter resistor components (e.g., $R_c$) of the output filter 30. The controller 100 in certain examples is programmable to accept programming values for the parameters of a given filter 30. The controller 100 in FIG. 2A is configured to compute the d and q axis capacitor currents $i_{cap.comp.d}$ and $i_{cap.comp.q}$ using the following equations via the compensation component 110, at least partially according to the filter component values 112 and the inverter electrical operating frequency $\omega_e$:

$$i_{cap\text{-}comp\text{-}d} = \left( V_{f\text{-}out\text{-}q} \frac{\omega_e^2 R_c C_f^2}{1+(\omega_e R_c C_f)^2} + V_{f\text{-}out\text{-}d} \frac{\omega_e C_f}{1+(\omega_e R_c C_f)^2} \right), \text{ and}$$

$$i_{cap\text{-}comp\text{-}q} = \left( V_{f\text{-}out\text{-}d} \frac{\omega_e^2 R_c C_f^2}{1+(\omega_e R_c C_f)^2} - V_{f\text{-}out\text{-}q} \frac{\omega_e C_f}{1+(\omega_e R_c C_f)^2} \right).$$

In the example of FIG. 2A, the controller 100 implements current control PI (proportional/integral) control components 212 and 214 respectively for d and q axis computation of corresponding voltage error signals $\Delta V_d$ and $\Delta V_q$ based on the inverter output current reference values 211d and 211q. The error signals $\Delta V_d$ and $\Delta V_q$ are respectively summed with scaled d and q axis filter output voltage values $V_{f.d}$ and $V_{f.q}$ from the scaling components 218, and the summed values $V_d$ and $V_q$ are used to compute d and q axis inverter output voltage signals or values $V_{inv.d}$ and $V_{inv.q}$. The object 220 sums the values $V_{inv.d}$ and $V_{inv.q}$ with the unscaled filter output voltage values $V_{f.out.d}$ and $V_{f.out.q}$ and frequency adjusted inverter output current values to provide inputs for low pass filter components 222 representing the transfer function of the output filter 30. The filter components 222 provide the d and q axis inverter output current signals or values $i_{inv.d}$ and $i_{inv.q}$ for further filtering using filter components 224 in the object 220 based on transfer functions of the transformer and cable, and these values are also provided to the scaling components 217 to compute inverter current feedback values $i_{inv.fbk.d}$ and $i_{inv.fbk.q}$.

The controller 110 implements closed loop control components 216 for d and q axis inverter voltage control using the PID components 212 and 214 according to the d and q axis motor current reference values $I_{prime.mot.ref.d}$ and $I_{prime.mot.ref}$, the inverter current feedback values $i_{inv.fbk.d}$ and $i_{inv.fbk.q}$, and the filter capacitor compensation current values $i_{cap.comp.d}$ and $i_{cap.comp.q}$ for steady state capacitor current compensation. In this example, the control components 216 sum or add the capacitor compensation currents filter capacitor compensation current values $i_{cap.comp.d}$ and $i_{cap.comp.q}$ and the respective motor current reference values $I_{prime.mot.ref.d}$ and $I_{prime.mot.ref}$ to provide d and q axis inverter current reference values $I_{prime.inv.ref.d}$ and $I_{prime.inv.ref}$. The controller 100 then subtracts the inverter current feedback values $i_{inv.fbk.d}$ and $i_{inv.fbk.q}$ from the inverter current reference values $I_{prime.inv.ref.d}$ and $I_{prime.inv.ref}$ to compute the inverter output current reference values 211d and 211q provided as inputs to the current PI control components 212 and 214, respectively. In this example, the controller 100 implements voltage control based on the outputs of the PI control component 212 and 214. In other examples, current control can be implemented.

The controller 100 provides the inverter switching control signals 102 at 310 in this example to control the inverter 46 according to the inverter output voltage control value(s) $V_{inv.d}$ and $V_{ind.q}$. In other possible implementations, the controller 100 operates to control the inverter 46 according to the inverter output current reference values inverter output current reference values 211d and 211q. In this example, the PI controllers 212 and 214 provide the computed inverter output current value(s) $Id,q_{in}$. The controller 100 thus implements capacitor current compensation for motor drives and other power conversion systems 40 to drive a motor 20 using an inverter 46 in systems employing and output sine wave filter 30 using filter parameters 112. Moreover, the drive 40 and the controller 100 are programmable to adapt to different filter and/or driven motor combinations. At 320, the controller 100 computes the speed feedback value $RPM_{fbk}$ according to the motor torque, for example, using an observer or other suitable technique, and the process 300 returns to 302 as described above. The process 300 in one example is repeated in each of a sequence of control cycles in order to regulate the speed and/or other characteristic of a driven motor load 20, such as torque, position, etc. In practice, without wishing to be tied to any particular theory, the steady state filter current compensation implemented by the controller 100 advantageously mitigates or avoids unwanted output oscillation in the motor speed and/or torque for sensorless electric submersible pump (ESP) and other applications, thereby facilitating higher frequency operation of the driven motor load 20. This is particularly beneficial for deep well pumping applications where pumping speeds are important and the motor cable 60 may be quite lengthy.

FIG. 2B shows another non-limiting example, in which the controller 100 provides steady state current compensation in controlling the motor speed using steady state-compensation component 110 as described above. In this example, the controller 100 computes the compensation current values $i_{cap.comp.d}$ and $i_{cap.comp.q}$ for using the above equation via the compensation component 110, at least partially according to the filter component values 112 and the inverter electrical operating frequency $\omega_e$. Unlike FIG. 2A, the controller 100 in the example of FIG. 2B subtracts the capacitor compensation current values $i_{cap.comp.d}$ and $i_{cap.comp.q}$ from the corresponding inverter feedback current values $i_{inv.fbk.d}$ and $i_{inv.fbk.q}$ to compute motor current feedback values $I_{prime.mot.ref.d}$ and $I_{prime.mot.ref}$. The controller 100 in this case sums the motor current feedback values $I_{prime.mot.ref.d}$ and $I_{prime.mot.ref}$ with the respective d and q axis motor current reference values $I_{prime.mot.ref.d}$ and $I_{prime.mot.ref}$ to compute the inverter output current reference values 211*d* and 211*q* for use as inputs to the current PI control components 212 and 214, respectively.

Referring now to FIGS. 4-9, FIG. 4 shows an equivalent electrical circuit of the power conversion system and drive 40, and the following provides a dynamic analysis of the drive 40. This equivalent circuit in FIG. 4 includes a power circuit of the sinewave filter 30 connected one side to the output of the inverter 46 and the other side of the filter 30 is connected to the equivalent 3-phase circuit of the transformer 50, the cable 60, and a permanent magnet (PM) motor load 20 referred to the primary side of the transformer 50. The equivalent electrical circuit of inverter 46, sinewave filter 30, transformer 50, cable 60, and motor 20 is given by the following equations (1a) and (2a):

$$L_\Sigma = L_{cbl} + L_{tr} \quad (1a)$$

$$R_\Sigma = R_{cbl} + R_{tr} + R_{st} \quad (2a)$$

Figure 4:
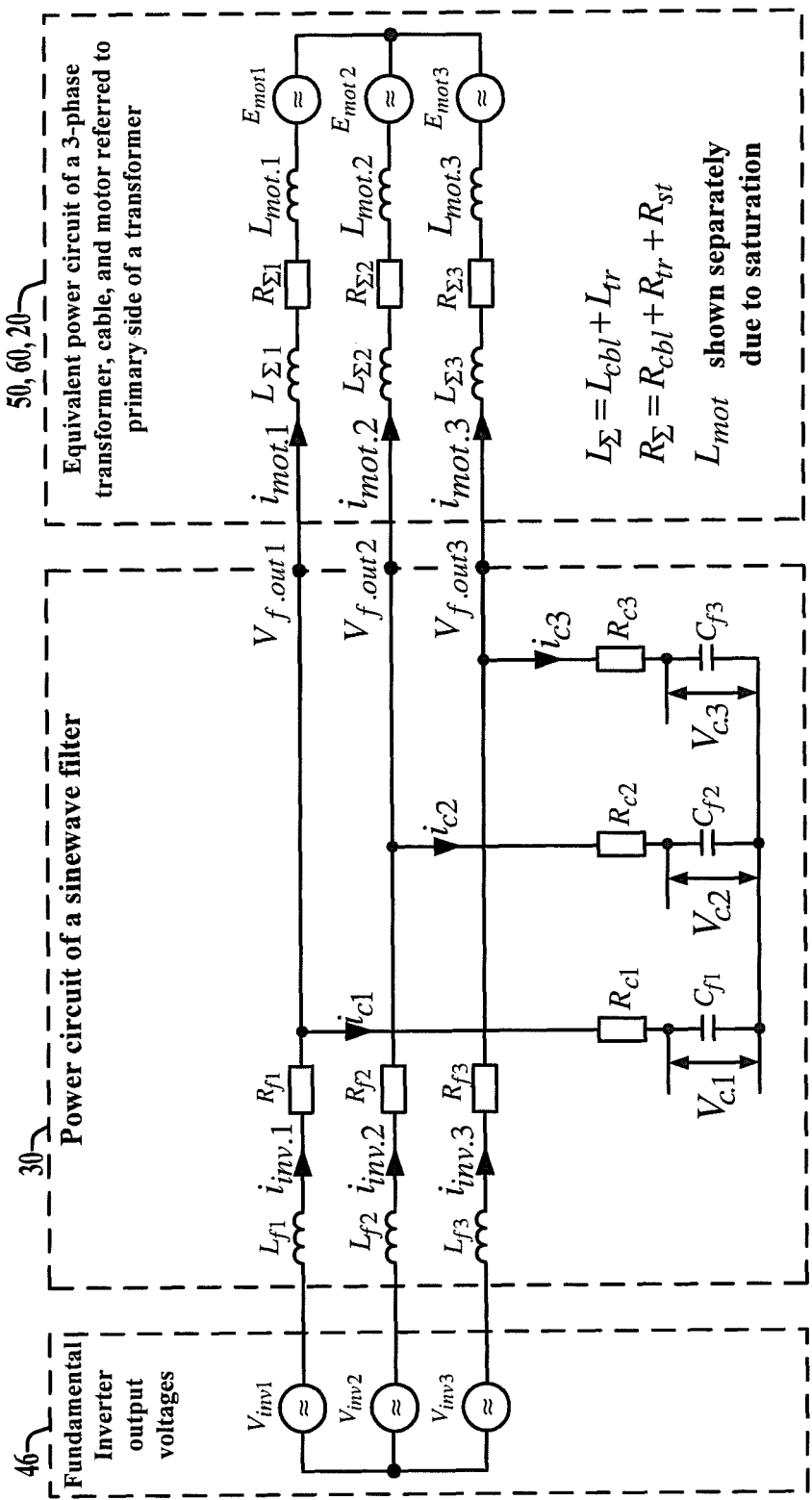
FIG. 4 is a schematic diagram.

The input of the sinewave filter 30 in FIG. 4 connects to the output of the inverter 46 ($V_{inv.k}$ in this example includes $V_{inv1}$, $V_{inv2}$ and $V_{inv3}$) and the output of the filter 30 is connected to the equivalent electrical circuit of the transformer 50, cable 60 and the motor 20 referred to the primary side of the transformer 50. For a balance three-phase system the following equations (1) and (2) describe the voltage and current conditions on the sinewave filter 30:

$$L_{f\cdot k}\frac{di_{inv\cdot k}}{dt} = V_{inv\cdot k} - V_{f\cdot out\cdot k} - R_{f\cdot k} i_{inv\cdot k}, \quad (1)$$

where: $k = 1, 2, 3$ $$C_{f\cdot k}\frac{dV_{c\cdot k}}{dt} = C_{f\cdot k}\frac{d(V_{f\cdot out\cdot k} - R_{c\cdot k} i_{c\cdot k})}{dt} = i_{c\cdot k},$$

Or:

$$C_{f\cdot k}\frac{dV_{f\cdot out\cdot k}}{dt} - R_{c\cdot k} C_{f\cdot k}\frac{di_{c\cdot k}}{dt} = i_{c\cdot k} \quad (2)$$

The transformation of variables between two and three phase systems is given by the following equations (3) and (4):

$$X_\alpha = \frac{1}{3}(2X_1 - X_2 - X_3) \quad (3)$$

$$X_\beta = \frac{1}{\sqrt{3}}(X_3 - X_2) \quad (4)$$

where:
$X_l \in \{V_l, E_l, i_l, i_{cl}\}$ $l = \alpha, \beta$ two-phase system variables
$X_k \in \{V_k, E_k, i_k, i_{ck}\}$ $k = 1, 2, 3$ three-phase system variables The stationary reference frame variables can be transformed into a synchronous reference frame using the following equations (5) and (6):

$$\overline{X}_{\alpha\beta} = X_\alpha - jX_\beta \quad (5)$$

$$\overline{X}_{q,d} = \overline{X}_{\alpha\beta} e^{-j\theta} \quad \theta = \int \omega \, dt \quad \omega = 2\pi f \quad (6)$$

where: $\overline{X}_{\alpha\beta}$ is a complex vector with components $X_\alpha$ and $X_\beta$ rotating counterclockwise, $\overline{X}_{q,d}$ is a synchronous frame representation of $\overline{X}_{\alpha\beta}$, and f is the fundamental frequency in Hz.

After applying 3 to 2 reference frame transformation per equations (3), (4) and (5), equations (1) and (2) can be rewritten in a vector form as shown in equations (7) and (8) below:

$$L_f \frac{d\bar{i}_{inv\cdot\alpha,\beta}}{dt} = \overline{V}_{inv\cdot\alpha,\beta} - \overline{V}_{f\cdot out\cdot\alpha,\beta} - R_f \bar{i}_{inv\cdot\alpha,\beta} \quad (7)$$

$$C_f \frac{d\overline{V}_{f\cdot out\cdot\alpha,\beta}}{dt} - R_c C_f \frac{d\bar{i}_{c\cdot\alpha,\beta}}{dt} = \bar{i}_{c\cdot\alpha,\beta} \quad (8)$$

According to the stationary to synchronous reference frame transformation of equation (6), "$\alpha,\beta$" can be expressed as a function of "q,d" as shown in equation (9) below:

$$\overline{X}_{\alpha\beta} = \frac{\overline{X}_{q,d}}{e^{-j\omega t}} = \overline{X}_{q,d} e^{j\omega t} \quad (9)$$

Equation (9) can be used to rewrite equations (7) and (8) as the following equations (10) and (11):

$$L_f \frac{d(\bar{i}_{inv\cdot q,d} \cdot e^{j\omega})}{dt} = \overline{V}_{inv\cdot q,d} e^{j\omega} - \overline{V}_{f\cdot out\cdot q,d} e^{j\omega} - R_f \bar{i}_{inv\cdot q,d} e^{j\omega} \quad (10)$$

$$C_f \frac{d(\overline{V}_{f\cdot out\cdot q,d} \cdot e^{j\omega})}{dt} - R_c C_f \frac{d(\bar{i}_{c\cdot q,d} \cdot e^{j\omega})}{dt} = \bar{i}_{c\cdot q,d} e^{j\omega} \quad (11)$$

Deferential can be wrote as follows:

$$\frac{d(\overline{X}_{q,d} \cdot e^{j\omega})}{dt} = \frac{d\overline{X}_{q,d}}{dt} e^{j\omega} + j\omega \overline{X}_{q,d} e^{j\omega} \quad (12)$$

Applying equation (12) into equations (10) and (11) yields the following equations (13) and (14):

$$L_f \frac{d\bar{i}_{inv\cdot q,d}}{dt} e^{j\omega} + j\omega L_f \bar{i}_{inv\cdot q,d} e^{j\omega} = \overline{V}_{inv\cdot q,d} e^{j\omega} - \overline{V}_{f\cdot out\cdot q,d} e^{j\omega} - R_f \bar{i}_{inv\cdot q,d} e^{j\omega} \quad (13)$$

$$C_f \frac{d\overline{V}_{f\cdot out\cdot q,d}}{dt} e^{j\omega} + j\omega C_f \overline{V}_{f\cdot out\cdot q,d} e^{j\omega} - R_c C_f \frac{d\bar{i}_{c\cdot q,d}}{dt} e^{j\omega} - j\omega R_c C_f \bar{i}_{c\cdot q,d} e^{j\omega} = \bar{i}_{c\cdot q,d} e^{j\omega} \quad (14)$$

Equations (13) and (14) can be rewritten as the following equations (15) and (16) after dividing the left and right parts of equations (13) and (14) by $e^{j\omega}$:

$$L_f \frac{d\bar{i}_{inv \cdot q,d}}{dt} + j\omega L_f \bar{i}_{inv \cdot q,d} = \bar{V}_{inv \cdot q,d} - \bar{V}_{f \cdot out \cdot q,d} - R_f \bar{i}_{inv \cdot q,d} \quad (15)$$

$$C_f \frac{d\bar{V}_{f \cdot out \cdot q,d}}{dt} + j\omega C_f \bar{V}_{f \cdot out \cdot q,d} - R_c C_f \frac{d\bar{i}_{c \cdot q,d}}{dt} - j\omega R_c C_f \bar{i}_{c \cdot q,d} = \bar{i}_{c \cdot q,d} \quad (16)$$

After some manipulation, the following equations (17) and (18) can be derived:

$$R_f\left(1 + p\frac{L_f}{R_f}\right)\bar{i}_{inv \cdot q,d} = \bar{V}_{inv \cdot q,d} - \bar{V}_{f \cdot out \cdot q,d} - j\omega L_f \bar{i}_{inv \cdot q,d} \quad (17)$$

$$pC_f \bar{V}_{f \cdot out \cdot q,d} = (1 + pR_c C_f)\bar{i}_{c \cdot q,d} - j\omega C_f \bar{V}_{f \cdot out \cdot q,d} - j\omega R_c C_f \bar{i}_{c \cdot q,d} \quad (18)$$

Equations (19) and (20) show the inverter output current:

$$\bar{i}_{inv \cdot q,d} = \frac{\bar{V}_{inv \cdot q,d} - \bar{V}_{f \cdot out \cdot q,d} - j\omega L_f \bar{i}_{inv \cdot q,d}}{R_f\left(1 + p\frac{L_f}{R_f}\right)} \quad (19)$$

$$\bar{i}_{c \cdot q,d} = \frac{pC_f}{1 + pR_c C_f}\bar{V}_{f \cdot out \cdot q,d} + j\frac{1}{1 + pR_c C_f}\omega C_f \bar{V}_{f \cdot out \cdot q,d} - j\frac{1}{1 + pR_c C_f}\omega R_c C_f \bar{i}_{c \cdot q,d} \quad (20)$$

Equation (19) can be rewritten in a scalar form shown in the following equations (21)-(23):

$$i_{inv \cdot q} - ji_{inv \cdot d} = \frac{1}{R_f\left(1 + p\frac{L_f}{R_f}\right)} (V_{inv \cdot q} - jV_{inv \cdot d} - V_{f \cdot out \cdot q} + jV_{f \cdot out \cdot d} - j\omega L_f i_{inv \cdot q} - \omega L_f i_{inv \cdot d}) \quad (21)$$

Or:

$$i_{inv \cdot q} = \frac{1}{R_f\left(1 + p\frac{L_f}{R_f}\right)} (V_{inv \cdot q} - V_{f \cdot out \cdot q} - \omega L_f i_{inv \cdot d}) \quad (22)$$

$$i_{inv \cdot d} = \frac{1}{R_f\left(1 + p\frac{L_f}{R_f}\right)} (V_{inv \cdot d} - V_{f \cdot out \cdot d} - \omega L_f i_{inv \cdot q}) \quad (23)$$

Rewriting equation (20) in a scalar form yields the following equations (24)-(30):

$$i_{c \cdot q} - ji_{c \cdot d} = \frac{pC_f}{1 + pR_c C_f} V_{f \cdot out \cdot q} - j\frac{pC_f}{1 + pR_c C_f} V_{f \cdot out \cdot d} + j\frac{1}{1 + pR_c C_f}\omega C_f V_{f \cdot out \cdot q} + \frac{1}{1 + pR_c C_f}\omega C_f V_{f \cdot out \cdot d} - j\frac{1}{1 + pR_c C_f}\omega R_c C_f i_{c \cdot q} - \frac{1}{1 + pR_c C_f}\omega R_c C_f i_{c \cdot d} \quad (24)$$

Or:

$$i_{c \cdot q} = \frac{pC_f}{1 + pR_c C_f} V_{f \cdot out \cdot q} + \frac{1}{1 + pR_c C_f}\omega C_f V_{f \cdot out \cdot d} - \frac{1}{1 + pR_c C_f}\omega R_c C_f i_{c \cdot d} \quad (25)$$

$$V_{f \cdot out \cdot q} = \frac{1 + pR_c C_f}{pC_f}\left[i_{c \cdot q} - \frac{1}{(1 + pR_c C_f)}\omega C_f V_{f \cdot out \cdot d} + \frac{1}{1 + pR_c C_f}\omega R_c C_f i_{c \cdot d}\right] \quad (26)$$

$$i_{c \cdot d} = \frac{pC_f}{1 + pR_c C_f} V_{f \cdot out \cdot d} - \frac{1}{1 + pR_c C_f}\omega C_f V_{f \cdot out \cdot q} + \frac{1}{1 + pR_c C_f}\omega R_c C_f i_{c \cdot q} \quad (27)$$

$$V_{f \cdot out \cdot d} = \frac{1 + pR_c C_f}{pC_f}\left[i_{c \cdot d} + \frac{1}{(1 + pR_c C_f)}\omega C_f V_{f \cdot out \cdot q} - \frac{1}{1 + pR_c C_f}\omega R_c C_f i_{c \cdot q}\right] \quad (28)$$

$$i_{c \cdot q} = i_{inv \cdot q} - i_{mot \cdot q}, \quad (29)$$

$$i_{c \cdot d} = i_{inv \cdot d} - i_{mot \cdot d} \quad (30)$$

where "$i_q$ and $i_d$" are "d,q" representation of currents "$i_1$, $i_2$, and $i_3$" in FIG. 4.

Figure 5:
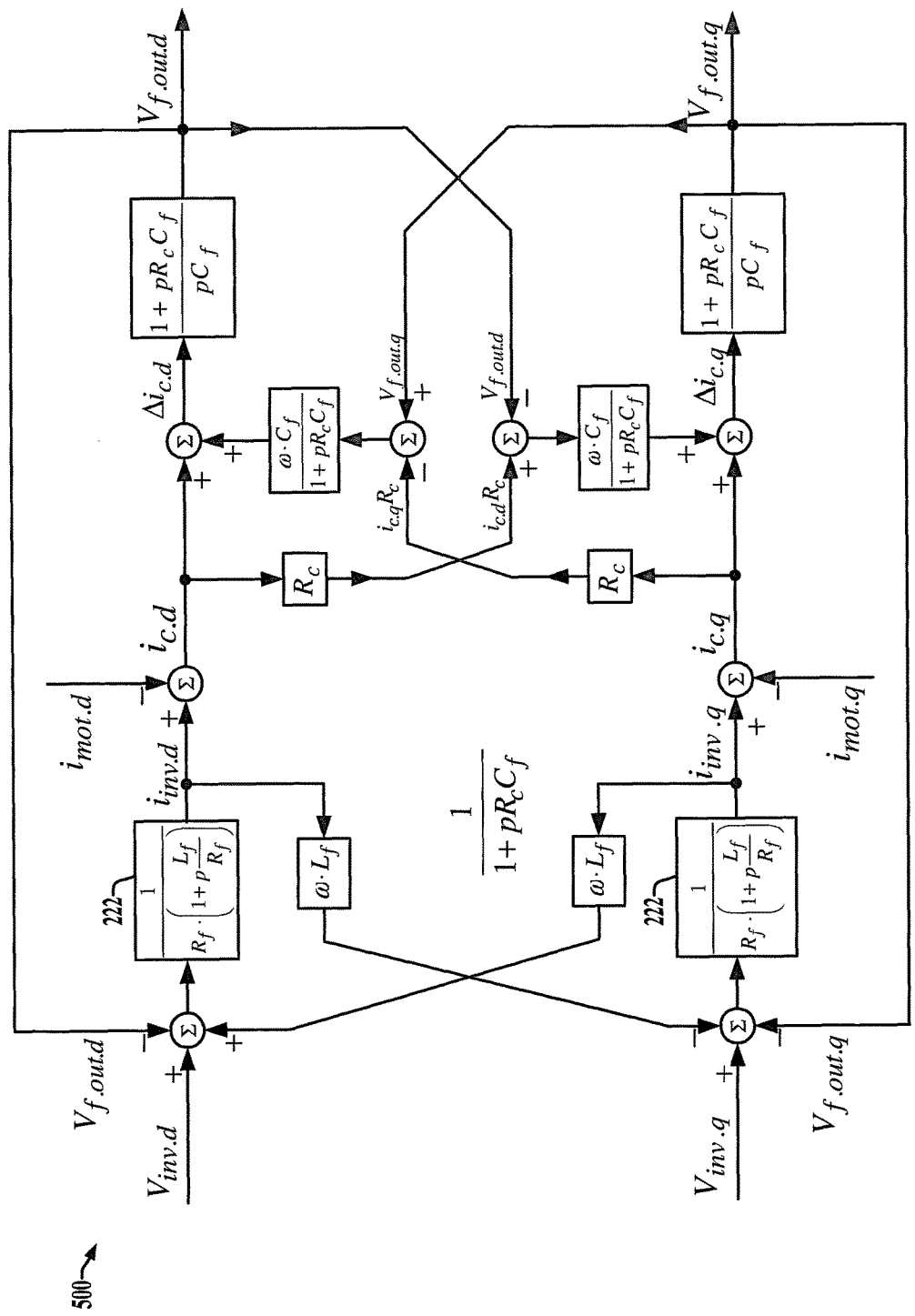
FIG. 5 is a schematic diagram.

FIG. 5 shows the dynamic block diagram of the LC filter 30 based on equations (22)-(23) and (25)-(30). Equations (31) and (32) show the voltage for a PM synchronous motor 20:

$$V_{mot \cdot d} = R_{st} I_{mot \cdot d} + L_{mot \cdot d}\frac{dI_{mot \cdot d}}{dt} - L_{mot \cdot q} I_{mot \cdot q} \omega_e \quad (31)$$

$$V_{mot \cdot q} = R_{st} I_{mot \cdot q} + L_{mot \cdot q}\frac{dI_{mot \cdot q}}{dt} + L_{mot \cdot d} I_{mot \cdot d} \omega_e + \Psi_{m0}\omega_e \quad (32)$$

The mechanical operation of an IPM motor 20 is given by the following equation (33):

$$J\frac{d\omega_e}{dt} = \frac{3}{2} p_n [\Psi_{m0} I_{mot \cdot q} + (L_{mot \cdot d} - L_{mot \cdot q}) I_{mot \cdot d} I_{mot \cdot q}] - T_{load} \quad (33)$$

The mechanical operation of an SPM motor 20 is given by the following equation (34):

$$J\frac{d\omega_e}{dt} = \frac{3}{2} p_n \Psi_{m0} I_{mot \cdot q} - T_{load} \quad (34)$$

Equations (31)-(32) can be rewritten as equations (35) and (36) below to take into account the electrical parameters of the transformer 50 and the cable 60:

$$V_{f \cdot out \cdot d} = R_\Sigma I_{mot \cdot d} + (L_\Sigma + L_{mot \cdot d})\frac{dI_{mot \cdot d}}{dt} - (L_\Sigma + L_{mot \cdot q}) I_{mot \cdot q} \omega_e \quad (35)$$

$$V_{f \cdot out \cdot q} = R_\Sigma I_{mot \cdot q} + (L_\Sigma + L_{mot \cdot q})\frac{dI_{mot \cdot q}}{dt} + (L_\Sigma + L_{mot \cdot d}) I_{mot \cdot d} \omega_e + \Psi_{m0}\omega_e \quad (36)$$

Equations (35) and (36) can be rewritten as the following equations (37) and (38):

$$I_{mot \cdot d} = \frac{V_{f \cdot out \cdot d} + (L_\Sigma + L_{mot \cdot q}) I_{mot \cdot q} \omega_e}{R_\Sigma\left[1 + \frac{(L_\Sigma + L_{mot \cdot d})}{R_\Sigma} p\right]} \quad (37)$$

$$I_{mot\cdot q} = \frac{V_{f\cdot out\cdot q} + (L_\Sigma + L_{mot\cdot d})I_{mot\cdot d}\omega_e - \Psi_{m0}\omega_e}{R_\Sigma\left[1 + \frac{(L_\Sigma + L_{mot\cdot q})}{R_\Sigma}p\right]} \quad (38)$$

Figure 6:
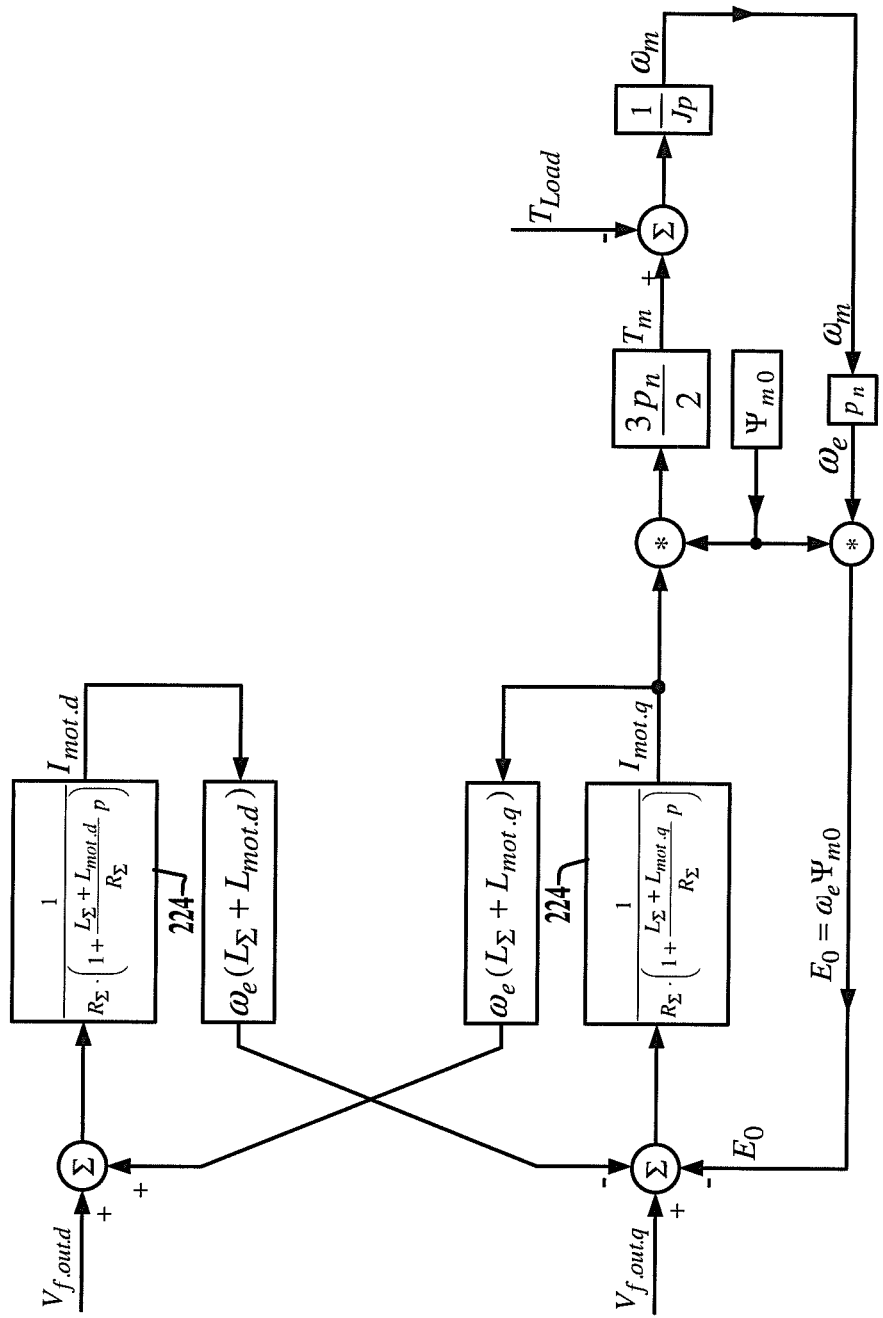
FIG. 6 is a schematic diagram.
Figure 7:
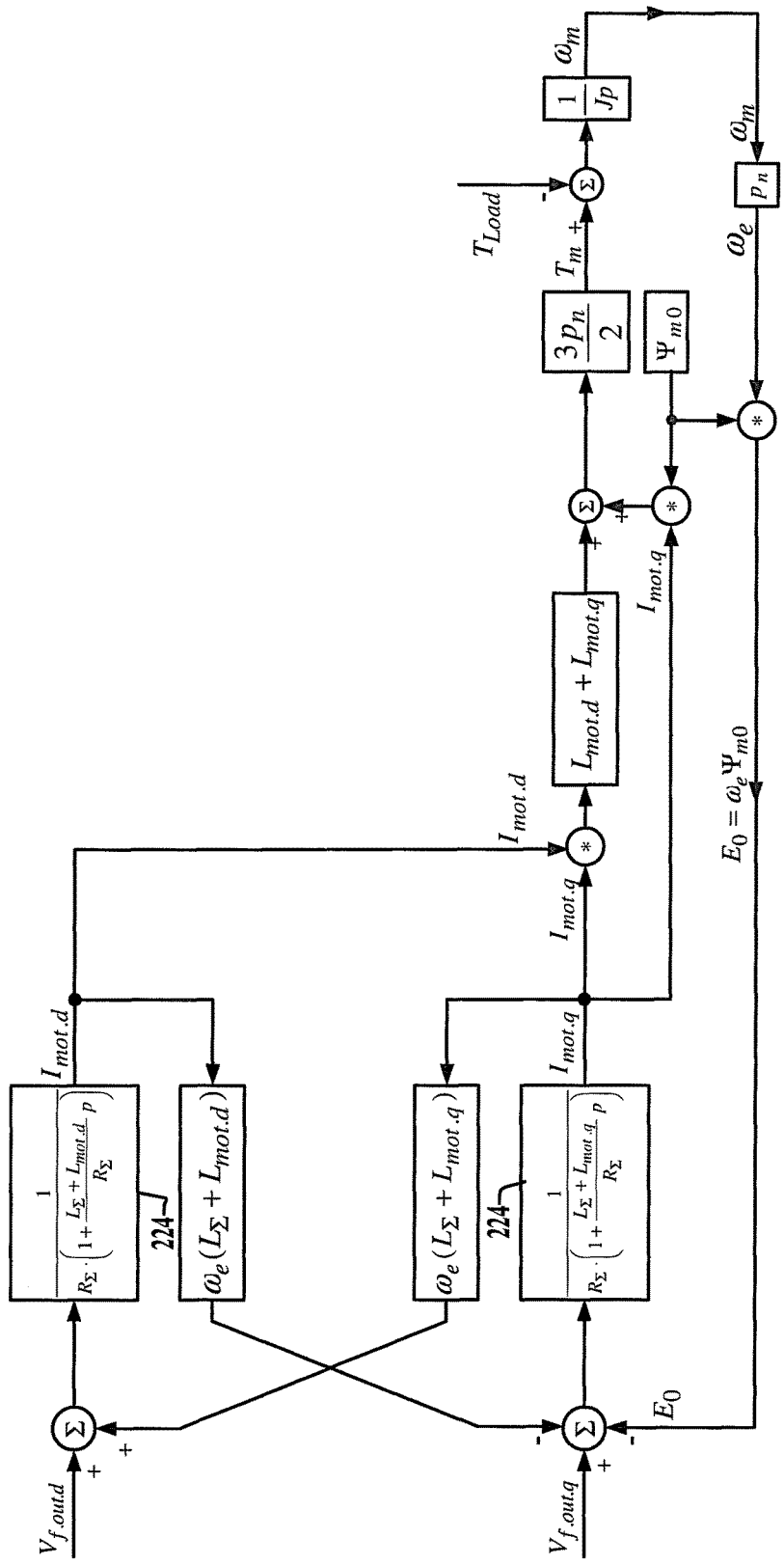
FIG. 7 is a schematic diagram.
Figure 8:
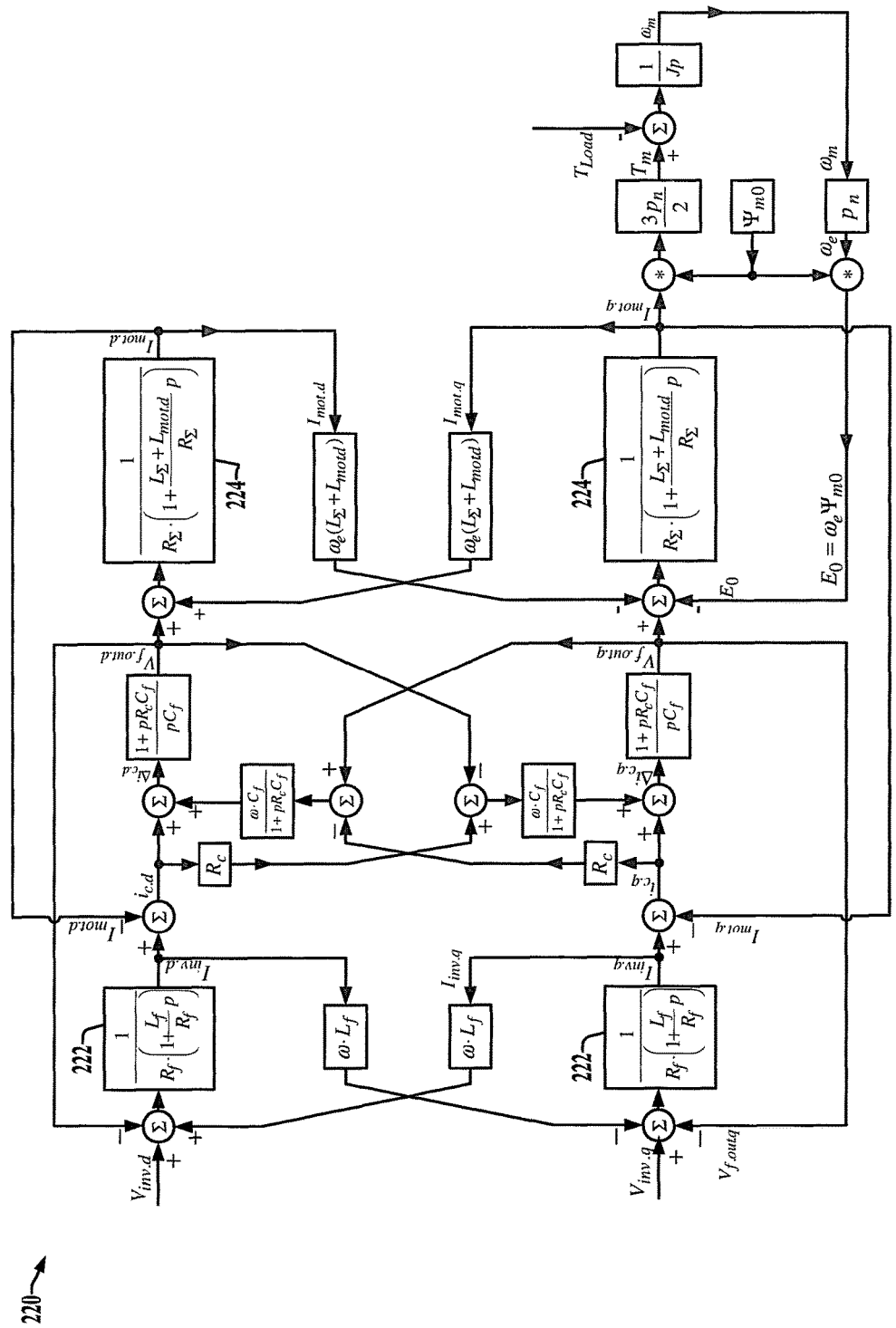
FIG. 8 is a schematic diagram.
Figure 9:
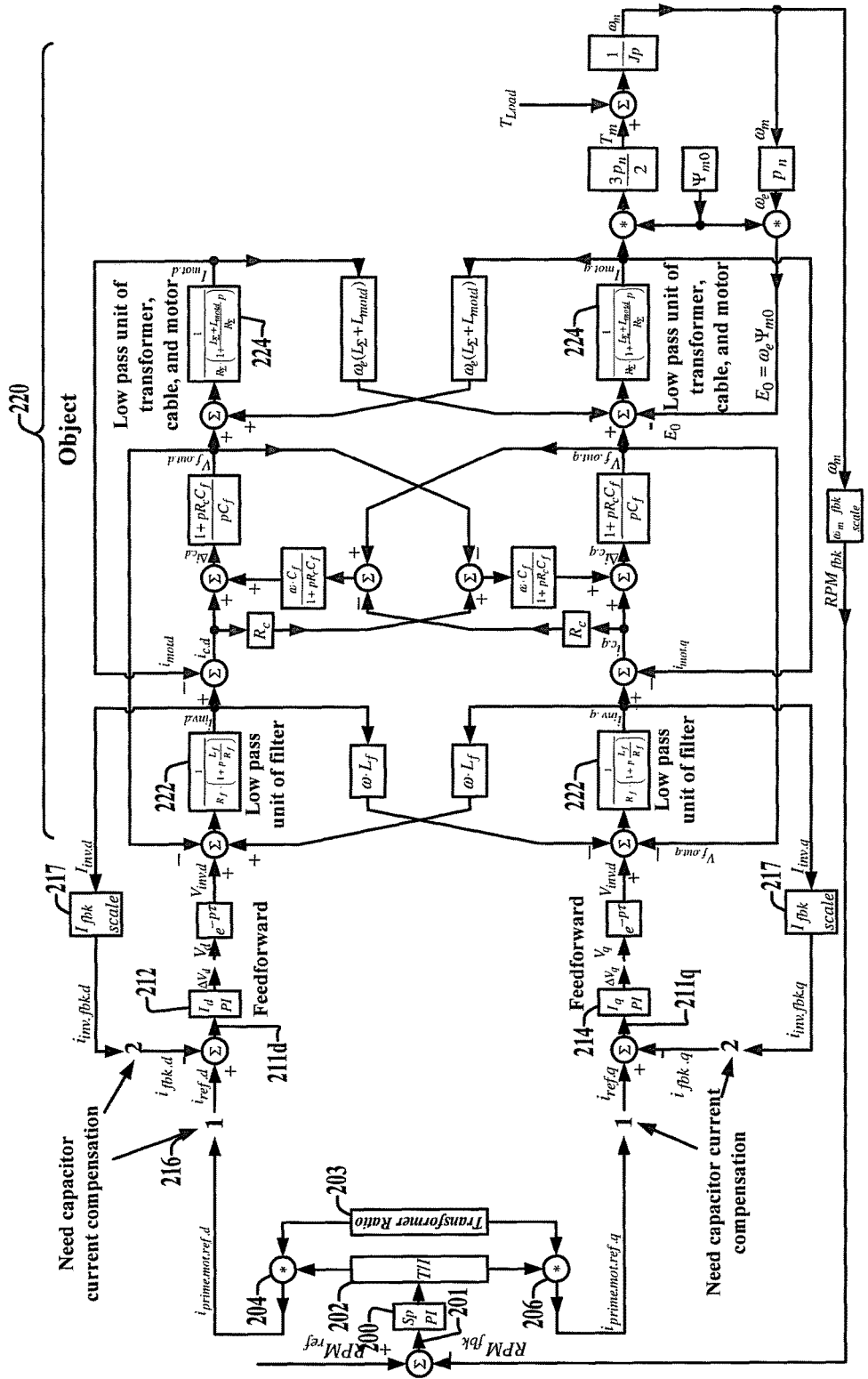
FIG. 9 is a schematic diagram.

FIG. 6 shows a dynamic block diagram for a system including an SPM motor 20, the transformer 50, and the cable 60 based on equations (34), (37) and (38). FIG. 7 shows a dynamic block diagram for a system including an IPM motor 20, the transformer 50, and the cable 60 based on equations (33), (37) and (38). FIG. 8 shows the d, q BCP drive object or model 220 (FIGS. 2A and 2B above and FIGS. 10A and 10B below) derived by combining FIGS. 4 and 6. FIG. 9 shows the BCP drive dynamic d, q block diagram without decoupling.

The following equation (39) can be derived for the d-axis:

$$I_{inv\cdot q} - I_{mot\cdot q} = i_{c\cdot q} \quad (39)$$

The capacitor current compensation $i_{c\cdot q}$ for the q-axis can be derived from equation (25) by forcing the differential terms to zero we will derive as follows:

$$i_{c\cdot q} = \omega C_f V_{f\cdot out\cdot d} - \omega R_c C_f i_{c\cdot d} \quad (40)$$

The q-axis inverter output current Iinv.q can be derived based on FIGS. 8 and 9 as set forth in the following equation (41):

$$I_{inv\cdot d} - I_{mot\cdot d} = i_{c\cdot d} \quad (41)$$

The capacitor current compensation for the d-axis can be derived from equation (27) by forcing the differential terms to zero as in the following equation (42):

$$i_{c\cdot d} = -\omega C_f V_{f\cdot out\cdot q} + \omega R_c C_f i_{c\cdot q} \quad (42)$$

Substituting equation (42) into equation (40) yields the following equation (43) after some manipulation:

$$I_{c\cdot q} = \frac{\omega_e C_f}{1 + (\omega_e R_c C_f)^2} V_{f\cdot out\cdot d} + \frac{\omega_e^2 R_c C_f^2}{1 + (\omega_e R_c C_f)^2} V_{f\cdot out\cdot q} \cdots \quad (43)$$

Substituting equation (40) into equation (42) yields the following equation (44) after some manipulation:

$$I_{c\cdot d} = \frac{\omega_e^2 R_c C_f^2}{1 + (\omega_e R_c C_f)^2} V_{f\cdot out\cdot d} - \frac{\omega_e C_f}{1 + (\omega_e R_c C_f)^2} V_{f\cdot out\cdot q} \quad (44)$$

The following equations (45)-(48) show steady-state capacitor current compensation in consideration of the filter damping resistors $R_c$ by combining equations (39), (43) and by combining equations (41), (44):

For the inverter d-current component:

$$I_{inv\cdot d} = I_{mot\cdot d} + \frac{\omega_e^2 R_c C_f^2}{1 + (\omega_e R_c C_f)^2} V_{f\cdot out\cdot d} - \frac{\omega_e C_f}{1 + (\omega_e R_c C_f)^2} V_{f\cdot out\cdot q} \quad (45)$$

For the motor d-current component:

$$I_{mot\cdot d} = I_{inv\cdot d} - \left[\frac{\omega_e^2 R_c C_f^2}{1 + (\omega_e R_c C_f)^2} V_{f\cdot out\cdot d} - \frac{\omega_e C_f}{1 + (\omega_e R_c C_f)^2} V_{f\cdot out\cdot q}\right] \quad (46)$$

For the inverter q-current component:

$$I_{inv\cdot q} = I_{mot\cdot q} + \frac{\omega_e C_f}{1 + (\omega_e R_c C_f)^2} V_{f\cdot out\cdot d} + \frac{\omega_e^2 R_c C_f^2}{1 + (\omega_e R_c C_f)^2} V_{f\cdot out\cdot q} \quad (47)$$

For the motor q-current component:

$$I_{mot\cdot q} = I_{inv\cdot q} - \left[\frac{\omega_e^2 C_f^2}{1 + (\omega_e R_c C_f)^2} V_{f\cdot out\cdot d} - \frac{\omega_e R_c C_f}{1 + (\omega_e R_c C_f)^2} V_{f\cdot out\cdot q}\right] \quad (48)$$

This compensation can be used in two different places (e.g., FIG. 9) according to equations (45)-(48), including the two implementations of the controller 100 in FIGS. 2A and 2B, both of which provide the same dynamic operations and performance.

Referring also to FIGS. 10A and 10B regarding instantaneous capacitor current compensation, the following equations (49) and (50) can be derived for the d-axis:

$$I_{inv\cdot d} - I_{mot\cdot d} = i_{c\cdot d} \quad (49)$$

$$\Delta i_{c\cdot d} = i_{c\cdot d} - \frac{\omega_e C_f}{1 + pR_c C_f} V_{f\cdot out\cdot q} + \frac{\omega_e C_f}{1 + pR_c C_f} i_{c\cdot q} R_c \quad (50)$$

However, the d-axis capacitor current in the filter 30 $\Delta i_{c\cdot d}$ can alternatively be expressed as shown in the following equation (51):

$$\Delta i_{c\cdot d} = \frac{\omega_e C_f}{1 + pR_c C_f} V_{f\cdot out\cdot d} \quad (51)$$

The following equation (52) for the d-axis filter capacitor current for control compensation can be derived from equations (38) and (39) as follows:

$$i_{c\cdot d} = \frac{\omega_e C_f}{1 + pR_c C_f}(V_{f\cdot out\cdot d} + V_{f\cdot out\cdot q}) - \frac{\omega_e C_f}{1 + pR_c C_f} i_{c\cdot q} R_c = \quad (52)$$
$$\frac{\omega_e C_f}{1 + pR_c C_f}(V_{f\cdot out\cdot d} + V_{f\cdot out\cdot q} - i_{c\cdot q} R_c)$$

According to FIGS. 8 and 9, the inverter q-axis output current $i_{inv\cdot q}$ can be determined according to the following equations (53) and (54):

$$I_{inv\cdot q} - I_{mot\cdot q} = i_{c\cdot q} \quad (53)$$

$$\Delta i_{c\cdot q} = i_{c\cdot q} + \frac{\omega_e C_f}{1 + pR_c C_f} V_{f\cdot out\cdot d} - \frac{\omega_e C_f}{1 + pR_c C_f} i_{c\cdot d} R_c \quad (54)$$

However, the q-axis capacitor current in the filter 30 $\Delta i_{c\cdot q}$ can alternatively be expressed as shown in the following equation (55):

$$\Delta i_{c\cdot q} = \frac{\omega_e C_f}{1 + pR_c C_f} V_{f\cdot out\cdot q} \quad (55)$$

The q-axis capacitor current compensation can be determined from equations (42) and (43) and expressed by the following equation (56):

$$i_{c \cdot q} = \frac{\omega_e C_f}{1 + pR_c C_f}(V_{f\text{-}out \cdot q} + V_{f\text{-}out \cdot q}) - \frac{\omega_e C_f}{1 + pR_c C_f} i_{c \cdot d} R_c = \quad (56)$$

$$\frac{\omega_e C_f}{1 + pR_c C_f}(V_{f\text{-}out \cdot q} + V_{f\text{-}out \cdot d} - i_{c \cdot d} R_c)$$

FIGS. 10A and 10B illustrate further non-limiting examples in which the controller 100 implements instantaneous current compensation. According to equations (52) and (56) the dynamic block diagram for instantaneous capacitor current compensation in d, q coordinate is shown in FIGS. 10A and 10B. In FIGS. 10A and 10B, the controller 100 computes the d and q axis capacitor currents $i_{cap.comp.d}$ and $i_{cap.comp.q}$ using equations (52) and (56) above via the compensation component 110, at least partially according to the filter component values 112 and the inverter electrical operating frequency $\omega_e$.

Like the examples in FIGS. 2A and 2B above, the controller 100 implements current control PI (proportional/integral) control components 212 and 214 for the d and q axis computation of corresponding voltage error signals $\Delta V_d$ and $\Delta V_q$ based on the inverter output current reference values 211d and 211q. The error signals $\Delta V_d$ and $\Delta V_q$ are respectively summed with scaled d and q axis filter output voltage values $V_{f.d}$ and $V_{f.q}$, from the scaling components 218, and the summed values $V_d$ and $V_q$ are used to compute d and q axis inverter output voltage signals or values $V_{inv.d}$ and $V_{inv.q}$. The object 220 sums the values $V_{inv.d}$ and $V_{inv.q}$ with the unscaled filter output voltage values $V_{f.out.d}$ and $V_{f.out.q}$ and frequency adjusted inverter output current values to provide inputs for low pass filter components 222 representing the transfer function of the output filter 30. The filter components 222 provide the d and q axis inverter output current signals or values $i_{inv.d}$ and $i_{inv.q}$ for further filtering using filter components 224 in the object 220 based on transfer functions of the transformer and cable, and these values are also provided to the scaling components 217 to compute inverter current feedback values $i_{inv.fbk.d}$ and $i_{inv.fbk.q}$.

The controller 110 in FIG. 10A implements closed loop control components 216 for d and q axis inverter voltage control using the PID components 212 and 214 according to the d and q axis motor current reference values $I_{prime.mot.ref.d}$ and $I_{prime.mot.ref}$; the inverter current feedback values $i_{inv.fbk.d}$ and $i_{inv.fbk.q}$, and the filter capacitor compensation current values $i_{cap.comp.d}$ and $i_{cap.comp.q}$ for instantaneous capacitor current compensation. In FIG. 10A, the control components 216 sum or add the capacitor compensation currents filter capacitor compensation current values $i_{cap.comp.d}$ and $i_{cap.comp.q}$ and the respective motor current reference values $I_{prime.mot.ref.d}$ and $I_{prime.mot.ref}$ to provide d and q axis inverter current reference values $I_{prime.inv.ref.d}$ and $I_{prime.inv.ref}$. The controller 100 subtracts the inverter current feedback values $i_{inv.fbk.d}$ and $i_{inv.fbk.q}$ from the inverter current reference values $I_{prime.inv.ref.d}$ and $I_{prime.inv.ref}$ to compute the inverter output current reference values 211d and 211q provided as inputs to the current PI control components 212 and 214, respectively. In this example, the controller 100 implements voltage control based on the outputs of the PI control component 212 and 214. In other examples, current control can be implemented.

The controller 100 provides the inverter switching control signals 102 to control the inverter 46 according to the inverter output voltage control values $V_{inv.d}$ and $V_{inv.q}$. In other possible implementations, the controller 100 operates to control the inverter 46 according to the inverter output current reference values inverter output current reference values 211d and 211q. In this example, the PI controllers 212 and 214 provide the computed inverter output current value(s) $Id,q_{.in}$. FIG. 10B shows another non-limiting example, in which the controller 100 provides instantaneous current compensation in controlling the motor speed using steady state-compensation component 110 as described above. In this example, the controller 100 computes the compensation current values $i_{cap.comp.d}$ and $i_{cap.comp.q}$ using the above equations (52) and (56) via the compensation component 110, at least partially according to the filter component values 112 and the inverter electrical operating frequency $\omega_e$. Like the example of FIG. 2B above, the controller 100 in FIG. 10B implements the control components 216 to subtract the capacitor compensation current values $i_{cap.comp.d}$ and $i_{cap.comp.q}$ from the corresponding inverter feedback current values $i_{inv.fbk.d}$ and $i_{inv.fbk.q}$ to compute motor current feedback values $I_{prime.mot.ref.d}$ and $I_{prime.mot.ref}$. The controller 100 in this example sums the motor current feedback values $I_{prime.mot.ref.d}$ and $I_{prime.mot.ref}$ with the respective d and q axis motor current reference values $I_{prime.mot.ref.d}$ and $I_{prime.mot.ref}$ to compute the inverter output current reference values 211d and 211q for use as inputs to the current PI control components 212 and 214, respectively.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:
1. A power conversion system, comprising:
an inverter comprising a DC input, an AC output, and a plurality of switching devices coupled between the DC input and the AC output and operative according to inverter switching control signals to convert DC electrical power received at the DC input to provide AC electrical output power at the AC output to drive a motor load through an output filter; and a controller configured to:
compute a speed error value according to a speed reference value and a speed feedback value using a summing component;
compute a torque reference value according to the speed error value using a proportional-integral control component;
compute a motor current reference value according to the torque reference value using a lookup table or a parametric equation;
compensate the motor current reference value according to capacitor currents of the output filter by computing an inverter output current reference value according to the motor current reference value, an inverter operating frequency, a capacitance value of filter capacitor components of the output filter, and a resistance value of filter resistor components of the output filter; and provide the inverter switching control signals to control the inverter according to the inverter output current reference value using a second proportional-integral control component;

wherein the controller computes d and q axis filter capacitor current values icap.comp.d and icap.comp.q according to the following equations:

$$i_{cap\cdot comp\cdot d} = \left(V_{f\cdot out\cdot q}\frac{\omega_e^2 R_c C_f^2}{1+(\omega_e R_c C_f)} + V_{f\cdot out\cdot d}\frac{\omega_e C_f}{1+(\omega_e R_c C_f)^2}\right), \text{ and}$$

$$i_{cap\cdot comp\cdot q} = \left(V_{f\cdot out\cdot d}\frac{\omega_e^2 R_c C_f^2}{1+(\omega_e R_c C_f)} + V_{f\cdot out\cdot d}\frac{\omega_e C_f}{1+(\omega_e R_c C_f)^2}\right);$$

where Vf.out.d and Vf.out.q are d and q axis filter output voltage values, Cf is a capacitance value representing capacitances of the filter capacitors of the filter, Rc is a resistance value representing resistances of the filter resistors of the filter, and ωe is the inverter operating frequency.

2. The power conversion system of claim 1, wherein the controller computes filter capacitor current values according to filter output voltage values representing output voltages of the filter, capacitance values representing capacitances of filter capacitors of the filter, resistance values representing resistances of filter resistors of the filter, and the inverter operating frequency representing the inverter electrical frequency of a previous control cycle.

3. The power conversion system of claim 2, wherein the controller computes filter capacitor current values for steady state filter capacitor control compensation.

4. The power conversion system of claim 2, wherein the controller computes a filter capacitor current value for instantaneous filter capacitor control compensation.

5. The power conversion system of claim 1, wherein the controller computes a filter capacitor current value for steady state filter capacitor control compensation.

6. The power conversion system of claim 5, wherein the controller compensates the motor current reference value according to the capacitor currents of the output filter by:
   computing an inverter current reference value as a sum of the filter capacitor current value and the motor current reference value;
   computing the inverter output current reference value by subtracting an inverter current feedback value from the inverter current reference value; and
   controlling the inverter at least partially according to the inverter output current reference value.

7. The power conversion system of claim 5, wherein the controller compensates the motor current reference value according to the capacitor currents of the output filter by:
   computing a motor current feedback value by subtracting the filter capacitor current value from an inverter current feedback value;
   computing the inverter output current reference value as a sum of the motor current feedback value and the motor current reference value; and
   controlling the inverter at least partially according to the inverter output current reference value.

8. The power conversion system of claim 1, wherein the controller computes a filter capacitor current value for instantaneous filter capacitor control compensation.

9. The power conversion system of claim 8, wherein the controller compensates the motor current reference value according to the capacitor currents of the output filter by:
   computing an inverter current reference value as a sum of the filter capacitor current value and the motor current reference value;
   computing the inverter output current reference value by subtracting an inverter current feedback value from the inverter current reference value; and
   controlling the inverter at least partially according to the inverter output current reference value.

10. The power conversion system of claim 8, wherein the controller compensates the motor current reference value according to the capacitor currents of the output filter by:
   computing a motor current feedback value by subtracting the filter capacitor current value from an inverter current feedback value;
   computing the inverter output current reference value as a sum of the motor current feedback value and the motor current reference value; and
   controlling the inverter at least partially according to the inverter output current reference value.

11. The power conversion system of claim 8, wherein the controller computes d and q axis filter capacitor current values $i_{cap.comp.d}$ and $i_{cap.comp.q}$ according to the following equations:

$$i_{cap\cdot comp\cdot d} = \frac{\omega_e C_f}{1+pR_c C_f}(V_{f\cdot out\cdot d} + V_{f\cdot out\cdot d} + i_{cap\cdot comp\cdot q}R_c), \text{ and}$$

$$i_{cap\cdot comp\cdot q} - \frac{\omega_e C_f}{1+pR_c C_f}(V_{f\cdot out\cdot q} - V_{f\cdot out\cdot d} + i_{cap\cdot comp\cdot q}R_c);$$

where $V_{f.out.d}$ and $V_{f.out.q}$ are d and q axis filter output voltage values, $C_f$ is a capacitance value representing capacitances of the filter capacitors ($C_{f}$, $C_{f2}$ and $C_{f3}$) of the filter, $R_c$ is a resistance value representing resistances of the filter resistors of the filter, and $\omega_e$ is the inverter operating frequency.

12. A power conversion system, comprising:
   an inverter comprising a DC input, an AC output, and a plurality of switching devices coupled between the DC input and the AC output and operative according to inverter switching control signals to convert DC electrical power received at the DC input to provide AC electrical output power at the AC output to drive a motor load through an output filter; and
   a controller configured to:
   compute a speed error value according to a speed reference value and a speed feedback value using a summing component;
   compute a torque reference value according to the speed error value using a proportional-integral control component;
   compute a motor current reference value according to the torque reference value using a lookup table or a parametric equation;
   compensate the motor current reference value according to capacitor currents of the output filter by computing an inverter output current reference value according to the motor current reference value, an inverter operating frequency, a capacitance value of filter capacitor components of the output filter, and a resistance value of filter resistor components of the output filter; and
   provide the inverter switching control signals to control the inverter according to the inverter output current reference value using a second proportional-integral control component;

wherein the controller computes d and q axis filter capacitor current values icap.comp.d and icap.comp.q according to the following equations:

$$i_{cap\text{-}comp\text{-}d} = \frac{\omega_e C_f}{1 + pR_c C_f}(V_{f\text{-}out\text{-}d} - V_{f\text{-}out\text{-}q} + i_{cap\text{-}comp\text{-}q}R_c), \text{ and}$$

$$i_{cap\text{-}comp\text{-}q} = \frac{\omega_e C_f}{1 + pR_c C_f}(V_{f\text{-}out\text{-}q} - V_{f\text{-}out\text{-}d} + i_{cap\text{-}comp\text{-}q}R_c);$$

where Vf.out.d and Vf.out.q are d and q axis filter output voltage values, Cf is a capacitance value representing capacitances of the filter capacitors of the filter, Rc is a resistance value representing resistances of the filter resistors of the filter, and ωe is the inverter operating frequency.

13. A method of operating an inverter to drive a motor load through an output filter, the method comprising:
using at least one processor implementing a summing component, computing a speed error value according to a speed reference value and a speed feedback value;
using at least one processor implementing a first proportional-integral control component, computing a torque reference value according to the speed error value;
using at least one processor implementing a lookup table or a parametric equation, computing a motor current reference value according to the torque reference value;
using at least one processor, compensating the motor current reference value according to capacitor currents of the output filter by computing an inverter output current reference value according to the motor current reference value, an inverter operating frequency, a capacitance value of filter capacitor components of the output filter, and a resistance value of filter resistor components of the output filter; and
using at least one processor implementing a second proportional-integral control component, controlling the inverter according to the inverter output current reference value; and
using at least one processor, computing d and q axis filter capacitor current values icap.comp.d and icap.comp.q according to the following equations:

$$i_{cap\text{.}comp\text{.}d} = \left(V_{f\text{.}out\text{.}q}\frac{\omega_e^2 R_c C_f^2}{1+(\omega_e R_c C_f)^2} + V_{f\text{.}out\text{.}d}\frac{\omega_e C_f}{1+(\omega_e R_c C_f)^2}\right), \text{ and}$$

$$i_{cap\text{.}comp\text{.}q} = \left(V_{f\text{.}out\text{.}d}\frac{\omega_e^2 R_c C_f^2}{1+(\omega_e R_c C_f)^2} - V_{f\text{.}out\text{.}q}\frac{\omega_e C_f}{1+(\omega_e R_c C_f)^2}\right);$$

where Vf.out.d and Vf.out.q are d and q axis filter output voltage values, Cf is a capacitance value representing capacitances of the filter capacitors of the filter, Rc is a resistance value representing resistances of the filter resistors of the filter, and ωe is the inverter operating frequency.

14. The method of claim 13, further comprising:
using at least one processor, computing filter capacitor current values according to filter output voltage values representing output voltages of the filter, capacitance values representing capacitances of filter capacitors of the filter, resistance values representing resistances of filter resistors of the filter, and the inverter operating frequency representing the inverter electrical frequency of a previous control cycle.

15. The method of claim 13, further comprising:
using at least one processor, computing a filter capacitor current value for steady state filter capacitor control compensation.

16. The method of claim 13, further comprising:
using at least one processor, computing a filter capacitor current value for instantaneous filter capacitor control compensation.

17. A non-transitory computer readable medium, comprising instructions that, when executed by at least one processor, cause the at least one processor to operate an inverter to drive a motor load through an output filter by:
implementing a summing component to compute a speed error value according to a speed reference value and a speed feedback value;
implementing a first proportional-integral control component to compute a torque reference value according to the speed error value;
implementing a lookup table or a parametric equation to compute a motor current reference value according to the torque reference value;
compensating the motor current reference value according to capacitor currents of the output filter by computing an inverter output current reference value according to the motor current reference value, an inverter operating frequency, a capacitance value of filter capacitor components of the output filter, and a resistance value of filter resistor components of the output filter;
implementing a second proportional-integral control component to control the inverter according to the inverter output current reference value; and
computing d and q axis filter capacitor current values icap.comp.d and icap.comp.q according to the following equations:

$$i_{cap\text{.}comp\text{.}d} = \left(V_{f\text{.}out\text{.}q}\frac{\omega_e^2 R_c C_f^2}{1+(\omega_e R_c C_f)^2} + V_{f\text{.}out\text{.}d}\frac{\omega_e C_f}{1+(\omega_e R_c C_f)^2}\right), \text{ and}$$

$$i_{cap\text{.}comp\text{.}q} = \left(V_{f\text{.}out\text{.}d}\frac{\omega_e^2 R_c C_f^2}{1+(\omega_e R_c C_f)^2} - V_{f\text{.}out\text{.}q}\frac{\omega_e C_f}{1+(\omega_e R_c C_f)^2}\right);$$

where Vf.out.d and Vf.out.q are d and q axis filter output voltage values, Cf is a capacitance value representing capacitances of the filter capacitors of the filter, Rc is a resistance value representing resistances of the filter resistors of the filter, and ωe is the inverter operating frequency.

18. The non-transitory computer readable medium of claim 17, comprising further computer executable instructions that, when executed by at least one processor, cause the at least one processor to compute filter capacitor current values according to filter output voltage values representing output voltages of the filter, capacitance values representing capacitances of filter capacitors of the filter, resistance values representing resistances of filter resistors of the filter, and the inverter operating frequency representing the inverter electrical frequency of a previous control cycle.

19. The power conversion system of claim 11, wherein the controller computes filter capacitor current values according to filter output voltage values representing output voltages of the filter, capacitance values representing capacitances of filter capacitors of the filter, resistance values representing resistances of filter resistors of the filter, and the inverter operating frequency representing the inverter electrical frequency of a previous control cycle.

20. The power conversion system of claim 14, wherein the controller computes filter capacitor current values according to filter output voltage values representing output voltages of the filter, capacitance values representing capacitances of filter capacitors of the filter, resistance values representing resistances of filter resistors of the filter, and the inverter operating frequency representing the inverter electrical frequency of a previous control cycle.

* * * * *